(12) United States Patent
Ishikawa et al.

(10) Patent No.: US 7,446,782 B2
(45) Date of Patent: Nov. 4, 2008

(54) IMAGE PROCESSING DEVICE

(75) Inventors: Takashi Ishikawa, Tokyo (JP); Masaki Higurashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 332 days.

(21) Appl. No.: 11/158,255

(22) Filed: Jun. 21, 2005

(65) Prior Publication Data

US 2006/0008155 A1     Jan. 12, 2006

(30) Foreign Application Priority Data

Jul. 7, 2004  (JP) ............................. 2004-200753

(51) Int. Cl.
  *H04N 1/40* (2006.01)
  *H04N 7/26* (2006.01)
  *H04N 5/22* (2006.01)
  *H04N 7/32* (2006.01)
  *G06K 9/36* (2006.01)
  *G06T 9/00* (2006.01)
  *G06T 3/40* (2006.01)
  *H04N 5/202* (2006.01)
  *H04N 7/12* (2006.01)
  *H04N 7/50* (2006.01)

(52) U.S. Cl. ........................ 345/643; 345/600; 345/606; 345/692; 348/394.1; 348/699; 382/238; 382/252; 382/254; 382/300; 375/240.12; 375/240.29

(58) Field of Classification Search ......... 345/600–606, 345/613–615, 639–640, 673, 690–692, 630; 382/232–235, 251, 237, 247–249, 162–167; 348/384, 394; 375/240, 243, 240.03, 240.12, 375/240.26, 240.27, 254

See application file for complete search history.

(56) References Cited

U.S. PATENT DOCUMENTS

| 5,550,647 | A | * | 8/1996 | Koike ........................ 358/3.03 |
| 5,699,079 | A | | 12/1997 | Gossett |
| 6,415,065 | B1 | * | 7/2002 | Miyake ....................... 382/300 |
| 6,556,214 | B1 | * | 4/2003 | Yamada et al. .............. 345/616 |
| 6,587,223 | B1 | * | 7/2003 | Yamaguchi ................. 358/1.9 |

(Continued)

FOREIGN PATENT DOCUMENTS

JP          10-013673         1/1998

(Continued)

OTHER PUBLICATIONS

Notification of Rejection Grounds for Japanese Patent Application No. 2004-200753, mailed Jun. 24, 2008 (8 pgs.) with partial translation (7 pgs.).

*Primary Examiner*—Sajous Wesner
(74) *Attorney, Agent, or Firm*—Straub and Pokotylo; John C. Pokotylo

(57) ABSTRACT

This is an image processing device for predicting the lower-order bits of target pixel data, based on one or more pieces of pixel data constituting image data. The image processing device comprises a lower-order bit calculation unit for calculating the lower-order bits of the target pixel data, based on one or more pieces of pixel data constituting image data and specifying the data as corrected lower-order bits and a lower-order bit superimposition unit for superimposing the corrected lower-order bits calculated by the lower-order bit calculation unit on higher-order bits of the target pixel data.

12 Claims, 21 Drawing Sheets

U.S. PATENT DOCUMENTS

| | | | |
|---|---|---|---|
| 6,744,929 B1 * | 6/2004 | Okada | 382/251 |
| 6,876,468 B1 * | 4/2005 | Kanno et al. | 358/1.9 |
| 6,944,929 B2 * | 9/2005 | Ogawa et al. | 29/458 |
| 2004/0010633 A1 * | 1/2004 | Ishikawa | 710/1 |

FOREIGN PATENT DOCUMENTS

| | | |
|---|---|---|
| JP | 10-026965 | 1/1998 |
| JP | 10-173488 | 6/1998 |
| JP | 2000-244922 | 9/2000 |

* cited by examiner

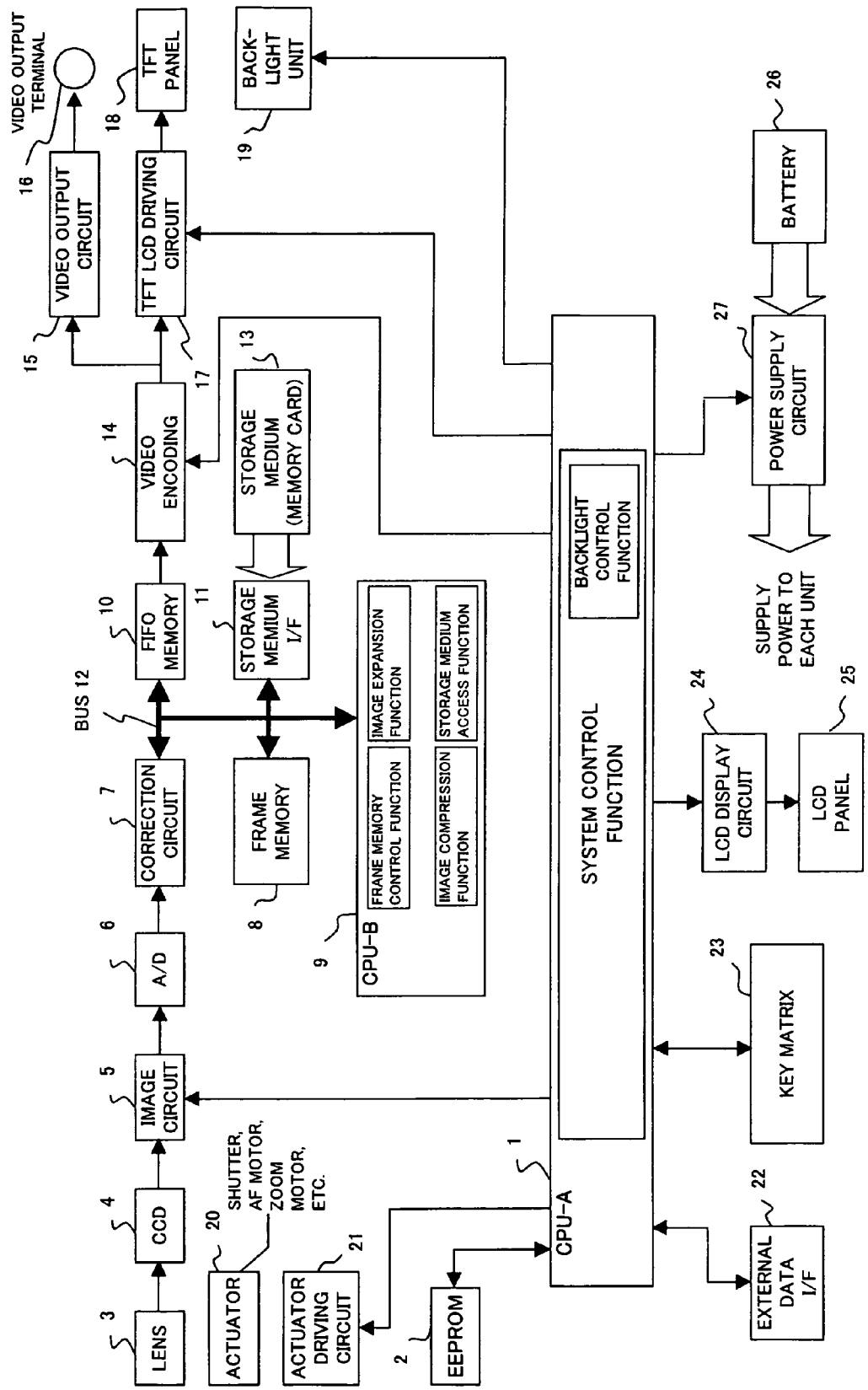
F I G. 1

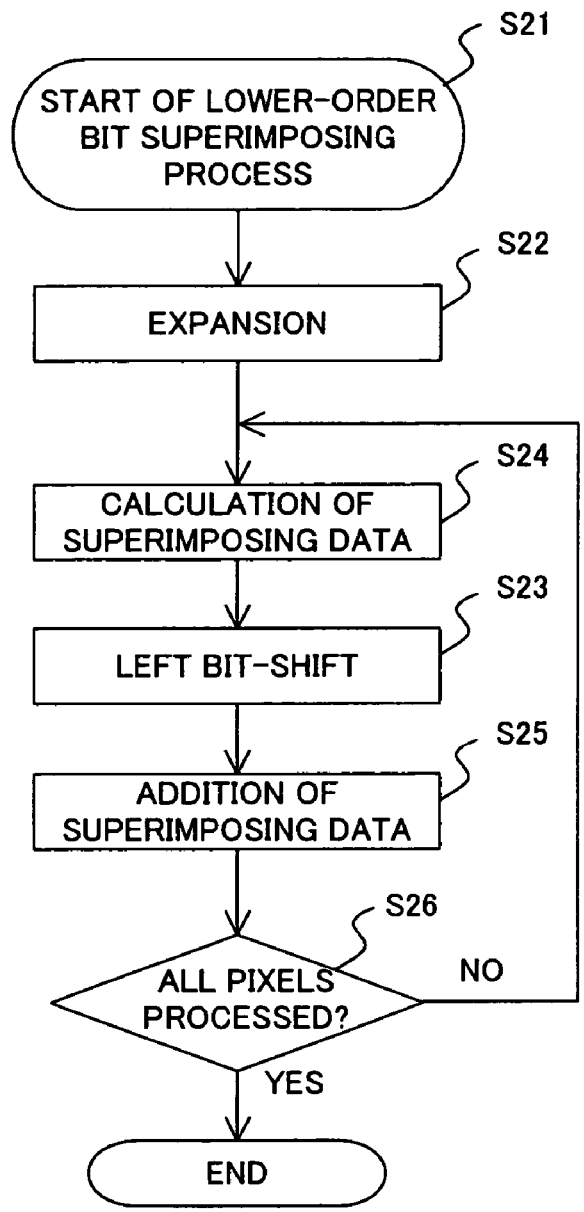
F I G. 3

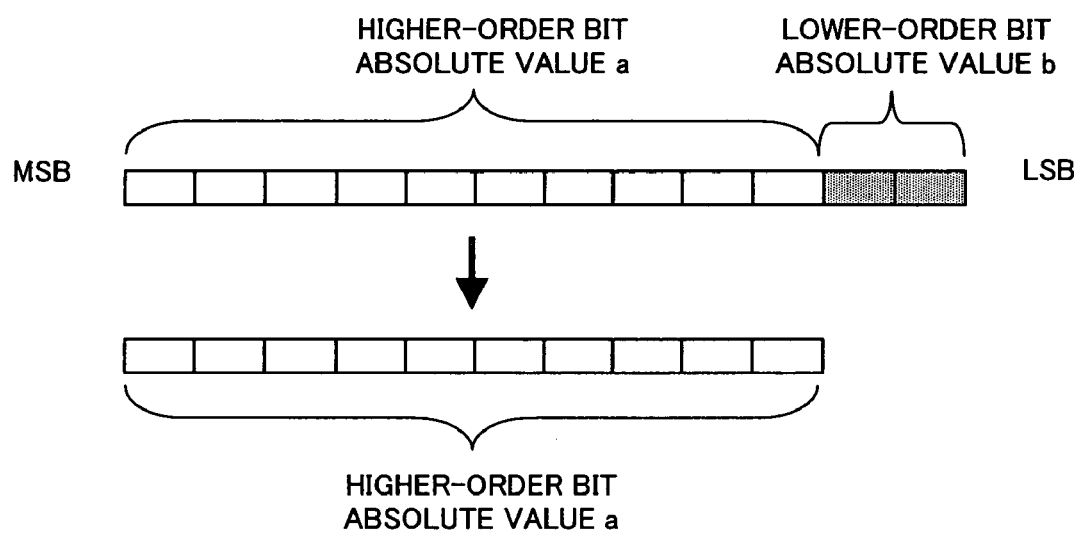
F I G. 4

|  |  |  |
|---|---|---|
| $a_{n-1}$ | $a_n$ | $a_{n+1}$ |
|  |  |  |

F I G. 9

| $b_{n-l-1}$ | $b_{n-l}$ | |
|---|---|---|
| $b_{n-1}$ | $a_n$ | |
| | | |

F I G. 1 3

| R | Gr | R | Gr |
|---|---|---|---|
| Gb | B | Gb | B |
| R | Gr $(a_n-1)$ | R $(a_n)$ | Gr $(a_n+1)$ |
| Gb | B | Gb | B |

FIG. 17

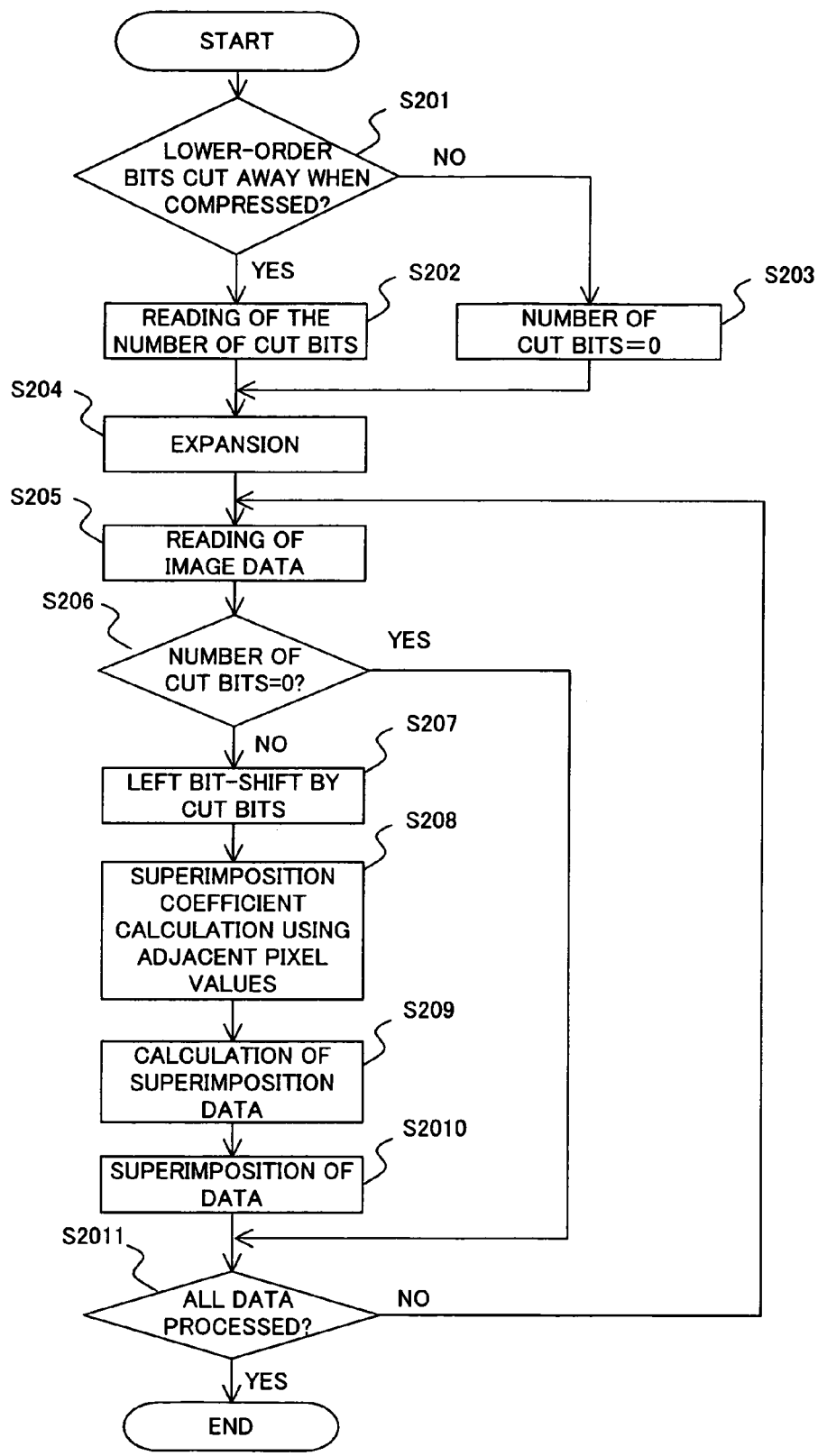
F I G. 2 0

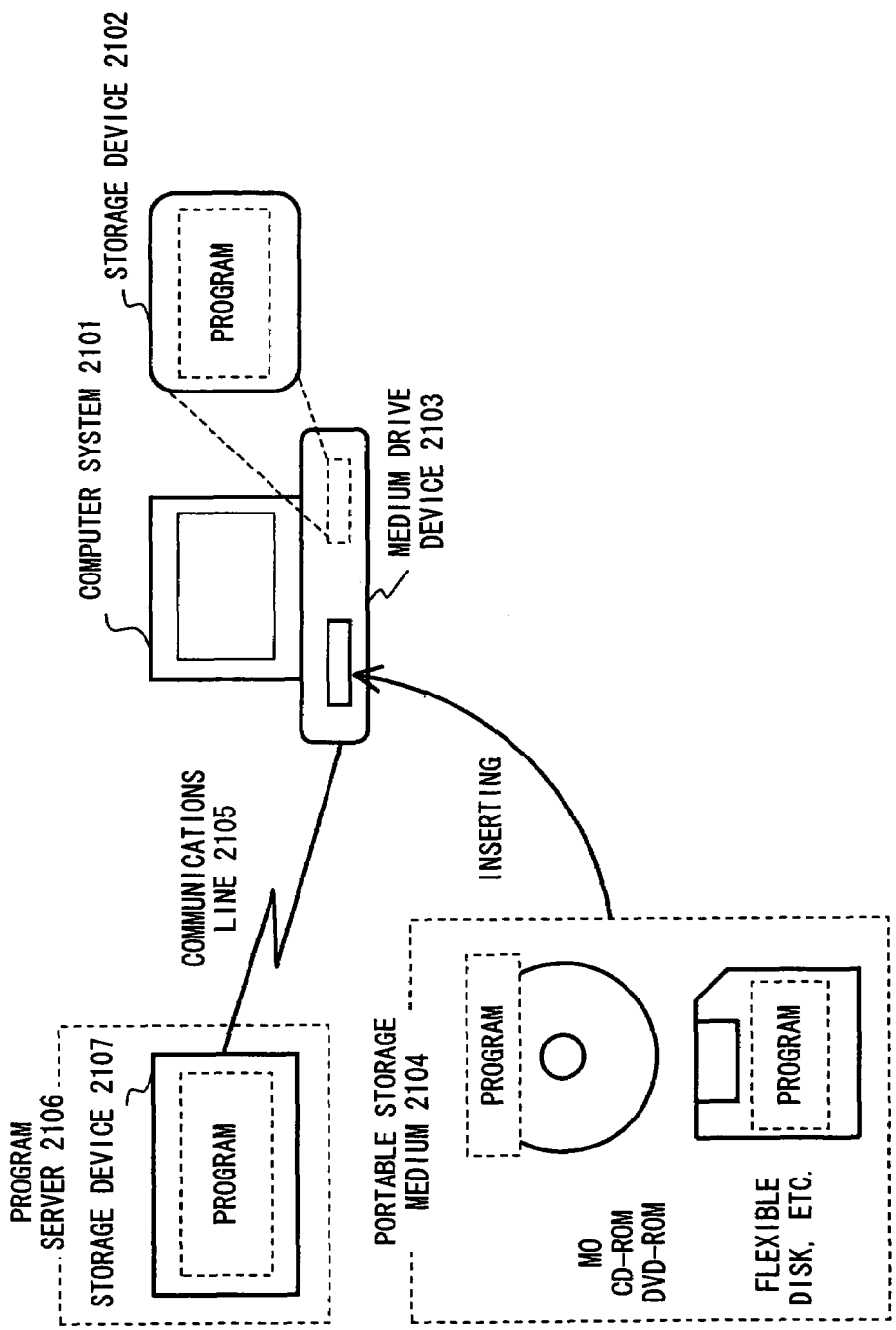
F I G. 21 ations for Related Art.

IMAGE PROCESSING DEVICE

CROSS REFERENCE TO RELATED APPLICATION

This application claims benefit of Japanese Application No. 2004-200753, filed Jul. 7, 2004.

BACKGROUND OF THE INVENTION

1. Field of the Invention

The present invention relates to an image processing device, such as a digital camera or the like, and more particularly, it relates to an image processing technology capable of improving S/N after compressing/expanding conversion and obtaining a favorable gradation characteristic.

2. Description of the Related Art

Recently, with the advance of image input equipment, such as a digital camera or the like, it has become possible to take in image data with high accuracy. Such image data taken in with high accuracy can be stored in a storage device, and a user can easily output the image data to an output device, such as a monitor, a printer or the like, by a personal computer or the like.

When storing image data, the image data is sometimes stored as digital signals of 12-14 bit per pixel. For example, if it is 12 bits, the number of gradation is 4096. In this way, the image data of 12-14 bits taken in with high accuracy is stored in a storage medium after it is not compressed or reversibly compressed.

In this case, if the image data of 12 bits per pixel is stored without being processed, the amount of the data becomes enormous. Therefore, the image data is stored in the storage medium after it is compressed.

As a method for storing images shot by an image input device, such as a digital camera or the like, there is a method for anticipating that the lower-order bits of image data are camera noise or the like and cutting them away. As the method for cutting lower-order bits, a method for cutting away the entire pixel and a method for modifying lower-order bits to be cut away case by case taking into considering the amount of noise are proposed.

Japanese Patent Application No. 2000-244922 discloses a method for cutting away lower-order bits, using the number of bits corresponding to a valid data value and setting the number of bits for each pixel (method for correlating lower-order bits to higher-order bits).

However, if image processing is applied to compressed data obtained by cutting away lower-order bits after it is being expanded, the image processing is applied with the reduced number of gradation due to the cutting of bits. Therefore, when compared with a case with no cutting of bits, an unnatural change of level (tone jump) occurs in the edge and gradation changing part of an image.

SUMMARY OF THE INVENTION

One aspect of the present invention is an image processing device for predicting the lower-order bits of target pixel data, based on one or more pieces of pixel data constituting the image data. The image processing device comprises a lower-order bit calculation unit for calculating the lower-order bits of the target pixel data, based on the one or more pieces of pixel data constituting the image data and specifying them as corrected lower-order bits and a lower-order bit superimposition unit for superimposing the corrected lower-order bits calculated by the lower-order bit calculation unit on higher-order bits of the target pixel data.

It is preferable for the lower-order bit calculation unit to calculate the corrected lower-order bits, based on the higher-order bits of the pixel data.

It is preferable for the lower-order bit calculation unit to determine a weighting coefficient of the image data and to calculate the corrected lower-order bits by multiplying the higher-order bits of the target pixel data by the weighting coefficient.

It is preferable for the lower-order bit calculation unit to calculate correlation between pixel values using pixel data in the neighborhood of the target pixel data and to calculate the corrected lower-order bits, based on the correlation.

It is preferable for the lower-order bit calculation unit to calculate the correlation by averaging higher-order bits of adjacent pixels on each side of the target pixel.

It is preferable for the lower-order bit calculation unit to calculate the correlation by averaging higher-order bits of pixels in the neighborhood of the target pixel.

It is preferable for the lower-order bit calculation unit to calculate a first color component correlation, based on the higher-order bits of a pixel with a different color component in the primary-color Bayer array in the neighborhood of the target pixel, to further calculate a second color component correlation, based on the result of the first color component correlation result and the higher-order bits of the pixel and to calculate the corrected lower-order bits, based on the second color component correlation.

It is preferable for the lower-order bit calculation unit to calculating the first color component correlation by calculating a function based on a correlation using the higher-order bits of pixels of the entire image data.

It is preferable for the lower-order bit calculation unit to calculate the first color component correlation by dividing the image data and calculating a function, based on the correlation using the higher-order bits of the pixel for each divided block.

It is preferable for the lower-order bit calculation unit to calculate the second color component correlation by calculating the corrected lower-order bits, using a table prepared beforehand using the values calculated based on the first color component correlation.

Another aspect of the present invention is a computer readable storage medium storing a program for enabling a computer to execute an image processing. The image processing comprises a lower-order bit calculation step of predicting the lower-order bits of target pixel data, based on one or more pieces of pixel data constituting image data, calculating the lower-order bits of the target pixel data, based on the one or more pieces of pixel data constituting the image data and specifying them as corrected lower-order bits, and a lower-order bit superimposition step of superimposing the corrected lower-order bits calculated by the lower-order bit calculation step on higher-order bits of the target pixel.

It is preferable to calculate the corrected lower-order bits, based on higher-order bits of the pixel data.

Another aspect of the present invention is a computer data signal embodied in a carrier wave, for representing a program for enabling a computer to execute an image processing. The image processing comprises a lower-order bit calculation step of predicting the lower-order bits of target pixel data, based on one or more pieces of pixel data constituting image data, calculating the lower-order bits of the target pixel data, based on the one or more pieces of pixel data constituting the image data and specifying them as corrected lower-order bits, and a lower-order bit superimposition step of superimposing the corrected lower-order bits calculated by the lower-order bit calculation step on higher-order bits of the target pixel data.

It is preferable to calculate the corrected lower-order bits, based on higher-order bits of the pixel data.

BRIEF DESCRIPTION OF THE DRAWINGS

FIG. 1 shows the configuration of the digital camera for implementing the present invention.

FIG. 3 is a flowchart showing the image processing (variation).

FIG. 4 shows the compression process of pixel data.

FIG. 9 shows the array of adjacent pixel data on each side.

FIG. 13 shows the array of adjacent pixel data on each side.

FIG. 17 shows the primary-color Bayer array.

FIG. 20 is the flowchart of the method using correlation with color components in the neighborhood.

FIG. 21 shows examples of the computer-readable storage medium on which is recorded a control program.

DESCRIPTION OF THE PREFERRED EMBODIMENTS

The First Preferred Embodiment

Figure 1:
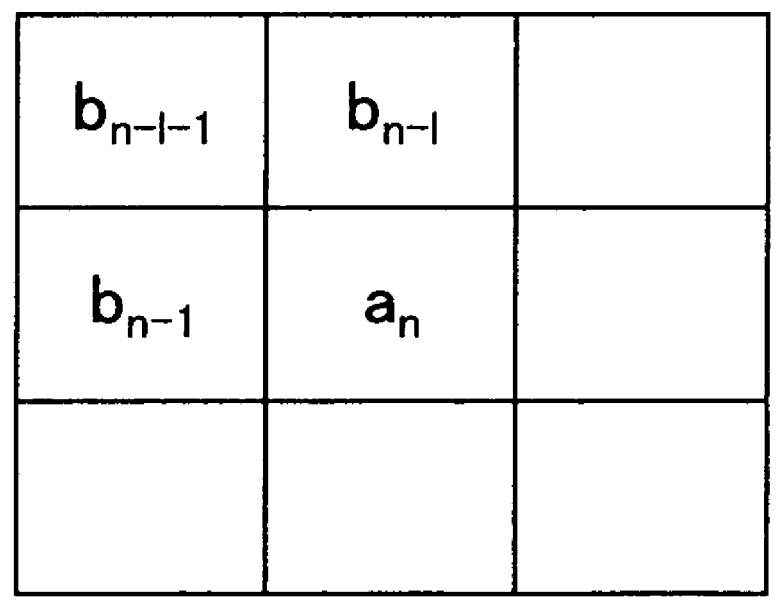
Figure 2:
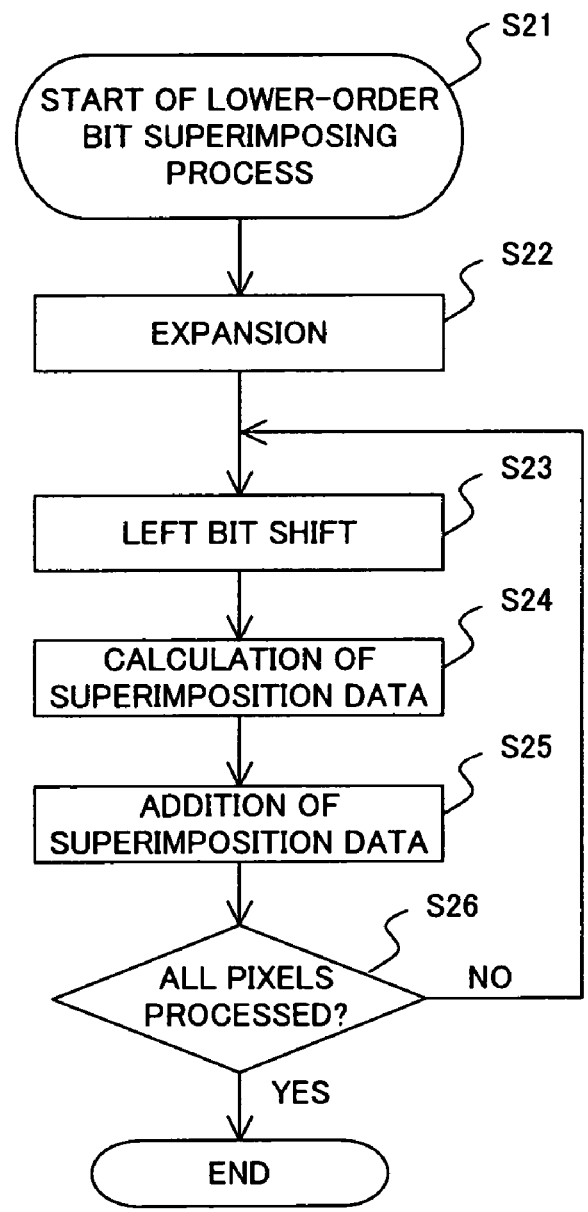
FIG. 2 is a flowchart showing the image processing.

The preferred embodiments of the present invention are described below with reference to the drawings. FIG. 1 shows the configuration of the digital camera for implementing the present invention. Although in this preferred embodiment, a digital camera is used as an image processing device, it is not limited to a digital camera.

A central processing unit (CPU)-A 1 controls the operation of this entire digital camera. Electrically erasable and programmable read-only memory (EEPROM) 2 stores a control program for enabling the CPU-A 1 to control the operation of the digital camera. The CPU-A 1 performs the above-mentioned control by executing this control program.

A lens 3 is an image sensing optical system for forming the image of an object on a charge coupled device (CCD) 4. The CCD 4 is an image sensing device for photo-electrically converting the formed image of an object and outputting electrical signals (analog signals) representing an image. An image sensing circuit 5 comprises a correlated double sampling (CDS) circuit, an automatic gain control (AGC) circuit and the like. The image sensing circuit 5 eliminates reset noise contained in the electrical signal outputted from the CCD 4, adjusts their signal levels and so on, under the control of the CPU-A 1.

An A/D conversion unit 6 converts the output signals (analog signals) of the image sensing circuit 5 into digital data. A correction circuit 7 applies a correction process, such as white balance, Y correction and the like, to a camera image represented by the digital data outputted from the A/D conversion unit 6.

The output of the correction circuit 7 is connected to frame memory 8, a CPU-B 9, first-in first-out (FIFO) memory 10 and a storage medium interface (I/F) 11 via a bus 12, and data can be transmitted/received between them under the control of the bus 12 by the CPU-B 9.

The frame memory 8 is used as buffer memory for temporarily storing camera images outputted from the correction circuit 7 and ones to which the CPU-B 9 has applied an image processing. Simultaneously, it is also used as a working memory area for a variety of processes by the CPU-B 9.

The CPU-B 9 performs the management of the frame memory 8 according to the control program provided inside (frame memory control function), applies the expansion process to compressed image data (image expansion function), applies a data compression process to a camera image (image compression function), performs an access control process to a storage medium 13 in order to write and read data (storage medium access function) and the like, under the control of the CPU-A 1.

In the compression and expansion processes of image data, for example, compression and expansion processes are performed by joint photographic experts group (JPEG) method.

The FIFO memory 10 is used to temporarily store image data representing an image to be displayed, and stores image data after the CPU-B has applied an image processing to it. The storage medium I/F 11 provides an interface function to transmit/receive data to/from the storage medium 13, and writes/reads data into/from the storage medium 13.

The storage medium 13 is used to store recorded data. A removable storage medium, such as a memory card in which semiconductor memory is built, or the like, is convenient for a digital camera. A video encoding circuit 14 superimposes on-screen information, such as date or the like, on an image represented by data read from the FIFO memory 10 under the control of the CPU-A 1.

A video output circuit 14 converts digital data outputted from the video encoding circuit 14 into video signals (image signals), being analog signals. A video output terminal 16 outputs video signals outputted from the video output circuit 15 to the outside of this digital camera.

A thin film transistor (TFT) liquid crystal device (LCD) driving circuit 17 drives a TFT panel 18, based on image signals outputted from the video encoding circuit 14. The TFT panel (TFT LCD panel) 18 is an LCD monitor driven by the TFT LCD driving circuit 17, for displaying an image represented by image signals outputted from the video encoding circuit 14.

This digital camera is provided with an optical finder, which is not shown in FIG. 1, and the object image formed on the CCD 4 can be shot without displaying it on an LCD monitor. Therefore, a user can set whether the LCD monitor should be operated, in this digital camera. In this case, if the user sets in such a way that the LCD monitor should not be operated, power consumption can be reduced at the time of the normal operation of this digital camera.

A backlight unit 19 constitutes the LCD monitor together with the TFT panel 18, and is provided with a light source for illuminating the LCD part of the TFT panel 18 from the back under the control of the CPU-A 1. As this light source, a white light emitting diode (LED) or the like is used.

An actuator 20 is an operating device, such as a motor for driving the lens (camera optical system) 3 (an AF motor, a zooming motor, etc), a mechanical shutter driving device, and is driven by an actuator driving circuit 21. the actuator driving circuit 21 drives the actuator 20 under the control of the CPU-A 1.

An external data I/F 22 provides an interface function to transmit/receive data between an external device, such as a personal computer or the like, and the CPU-A 1, and is, for example, a universal serial bus (UBS) type I/F. A key matrix unit 23 can be obtained by wiring a variety of keys, switches, buttons and the like for receiving a variety of instructions from a user and notifying the CPU-A 1 of them. This key matrix unit 23 also includes a release button which is operated to enable this digital camera to shoot an image. The CPU-A 1 can detect the first release (so called half shutter) and second release (so called full shutter) of the release button.

An LCD display circuit 24 drives an LCD panel 25 under the control of the CPU-A 1. The LCD panel 25 is driven by the LCD display circuit 24, and displays a variety of setting statuses of this digital camera, such as exposure, shutter speed or the like, according to its driving signal, and the number of images which can be currently shot or recorded.

A battery 26 supplies this digital camera with power. A power supply circuit 27 controls voltage supplied from the battery 26 to supply each unit of the digital camera with power. The CPU-A 1 monitors the voltage of the battery 26 for supplying the power supply circuit 27 with power. If its voltage value even temporarily drops below a predetermined value when this digital camera normally operates (at the time of power-on), the CPU-A 1 prohibits this digital camera to shoot after that and does not perform a shooting process even if the release button is operated.

In this case, a general personal computer can also be used for the CPU-A 1, frame memory 8, CPU-B 9, TFT LCD driving circuit 17 and TFT panel 18.

Processes described later can be performed by a computer program, and the process program is recorded on a storage medium, such as CD-ROM, etc., a hard disk or the like. The process program on the memory of the personal computer is read as requested, and the CPU executes it to control each device connected to the personal computer.

Alternatively, the storage medium can be a storage device which is provided for a computer, is connected to the computer via a communication line and functions as a program server.

In this case, a transmission signal which can be obtained by modulating a carrier wave by a data signal representing the control program is transmitted from the program server to the computer via the communication line, being a transmission medium. In the computer, the CPU can execute this process program by demodulating the received transmission signal and reproducing the process program.

Preferred Embodiment 1

Next, the image processing of the present invention in the digital camera with such a configuration is described. In this preferred embodiment, 12-bit pixel data composed of higher-order bits a (10 bits) and lower-order bits b (2 bits) are processed by a method using correlation with higher-order bits.

FIGS. 2 and 3 are flowcharts of the image processing. FIGS. 2 and 3 show that calculated lower-order bits (corrected lower-order bits) are added to (superimposed on) an image stored as pixel data obtained by cutting away the lower-order bits of the data bits of one pixel as camera noise as superimposition data instead of the cut bits (lower-order bits).

The flowchart shown in FIG. 2 is described below.

In step S21, the superimposition process of lower-order bits is started, and pixel data whose lower-order bits are cut away and compressed prior to S21 is handed.

In step S22, the compressed data is expanded, and in step S23, the entire bits are shifted to the left side by the cut lower-order bits.

Then, in step S24, data to be superimposed as lower-order bits is calculated, and in step S25, the superimposition data is added.

The processes in steps S23 through S25 are applied to all pixels. If in step S26 it is determined that all the pixels are process, the process proceeds to YES and terminates. If it is NO, the processes in steps S23 through S25 are repeated.

FIG. 3 shows a variation of FIG. 2, in which the order of processes is replaced. The flowchart shown in FIG. 3 is described below. In steps S21, S22 and S26, the same processes as in FIG. 2 are performed, and the order of the processes in steps S23 through S25 is replaced.

In FIG. 3, the process in step S24 is firstly performed and data to be superimposed as lower-order bits is calculated. Then, in step S23 the entire bits are shifted to the left side by the cut lower-order bits. Then, in step S25, the superimposition data is added. Therefore, the result of FIG. 3 is the same as that of FIG. 2.

Next, the above-mentioned process is described in more detail with reference to FIGS. 4 and 5. In FIG. 4, the 12-bit pixel data composed of the higher-order bits a (10 bits) and lower-order bits b (2 bits) are taken into the CPU-B 9, and the lower-order bits b are cut way by the image compression function to be modified to 100 bit data. Then, a compression process is applied, and the pixel data is stored. So far the process in step 21 is described.

Figure 5:
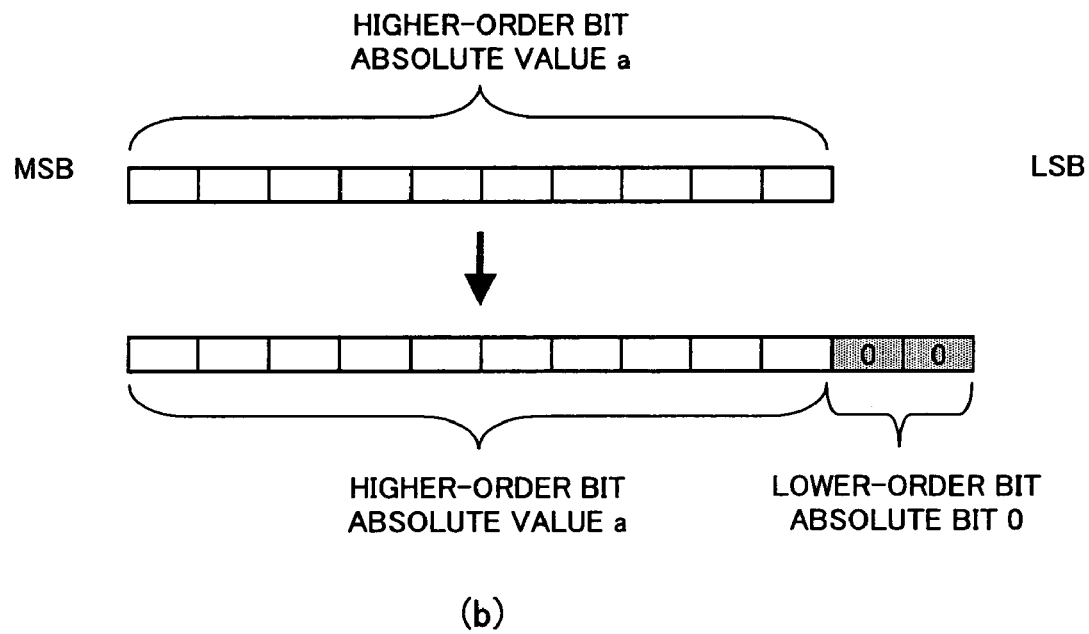
FIG. 5 shows the expansion process of pixel data.

Then, in FIG. 5, when outputting the image data, such as when displaying the image data on the TFT panel 8 or so on, the data compressed and stored in step S21 is called up, is expanded by the expansion process of the CPU-B 9 to be converted into 10-bit data. Then, the higher-order bits a are shifted by two bits, and the superimposition data calculated in step S24 is superimposed as lower-order bits to generate 12-bit data.

Next, the superimposition data calculated in S24 is described. In this preferred embodiment 1, a method for superimposing superimposition data randomly calculated as lower-order bits is used, which is described with reference to FIG. 6.

In S61, the expanded 10-bit pixel data two bits of which are cut away when compressed is shifted to the left side by two bits.

Then, in S62, 0 is superimposed in the places of two lower-order bits b0 and b1. In this case, 0 is superimposed in each of b0 and b1.

In S63, lower-order bits b are calculated according to equation (1) of S63. Firstly, equation (1) of S63 calculates $\omega(a)$ by comparing them with the higher-order bits a. If the higher-order bits a are 0 or 1, equation (2) of S63 sets the lower-order bits cut away when compressed to 0.

If the higher-order bits a are other than 0, equation (3) randomly selects superimposition data. In this case, if the lower-order bits b are two bits, ω(a) selects values 00, 01, 10 and 11, and calculates equation (1) of S63, b=ω(a)·a to specify the lower-order bits of the multiplied 12-bit data as b. If they are two bits, its higher-order bits can also be selected as b.

In S64, the lower-order bits b calculated in S63 are superimposed on the higher-order bits a as superimposition data.

Figure 6:
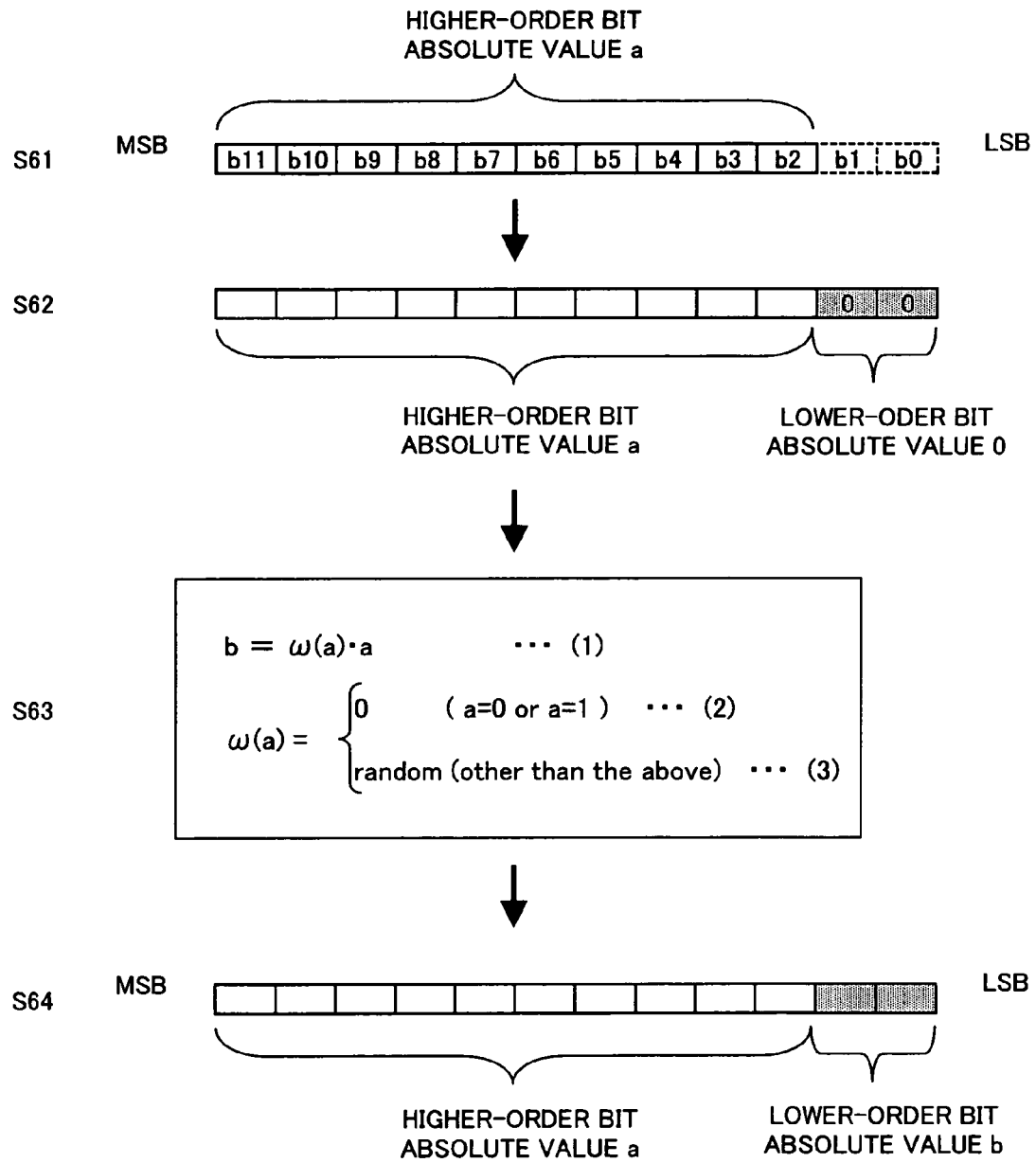
Fig. 6 shows a method using correlation with higher-order bits.
Figure 7:
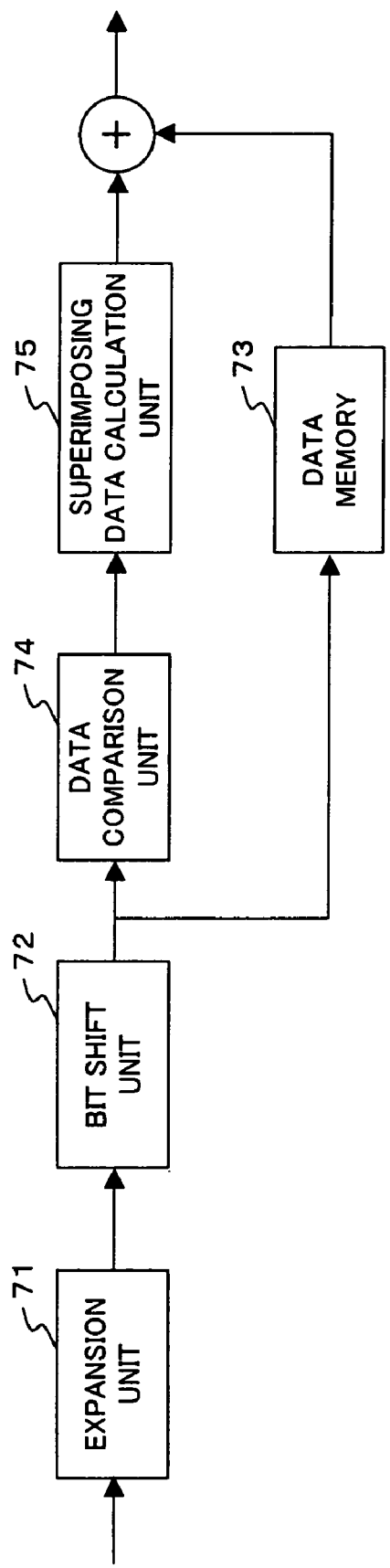
FIG. 7 shows the configuration of the method using correlation with higher-order bits.

FIG. 7 shows the configuration for executing S61 through S64 shown in FIG. 6. The cut 10-bit pixel data is expanded by an expansion unit 71. Then, a bit shift unit 72 performs the processes in S61 and S62, and data memory 73 stores the result of S62.

Then, a data comparison unit 74 calculates ω(a), based on the higher-order bits a according to the conditions of S63. Then, a superimposition data calculation unit 75 calculates equation (1) of S63 to calculate the lower-order bits b. After the calculation, the operation shown in S64 are performed. Specifically, the superimposition data is superimposed on (added to) the left-shifted 10-bit pixel data stored in the data memory to generate 12-bit pixel data.

Figure 8:
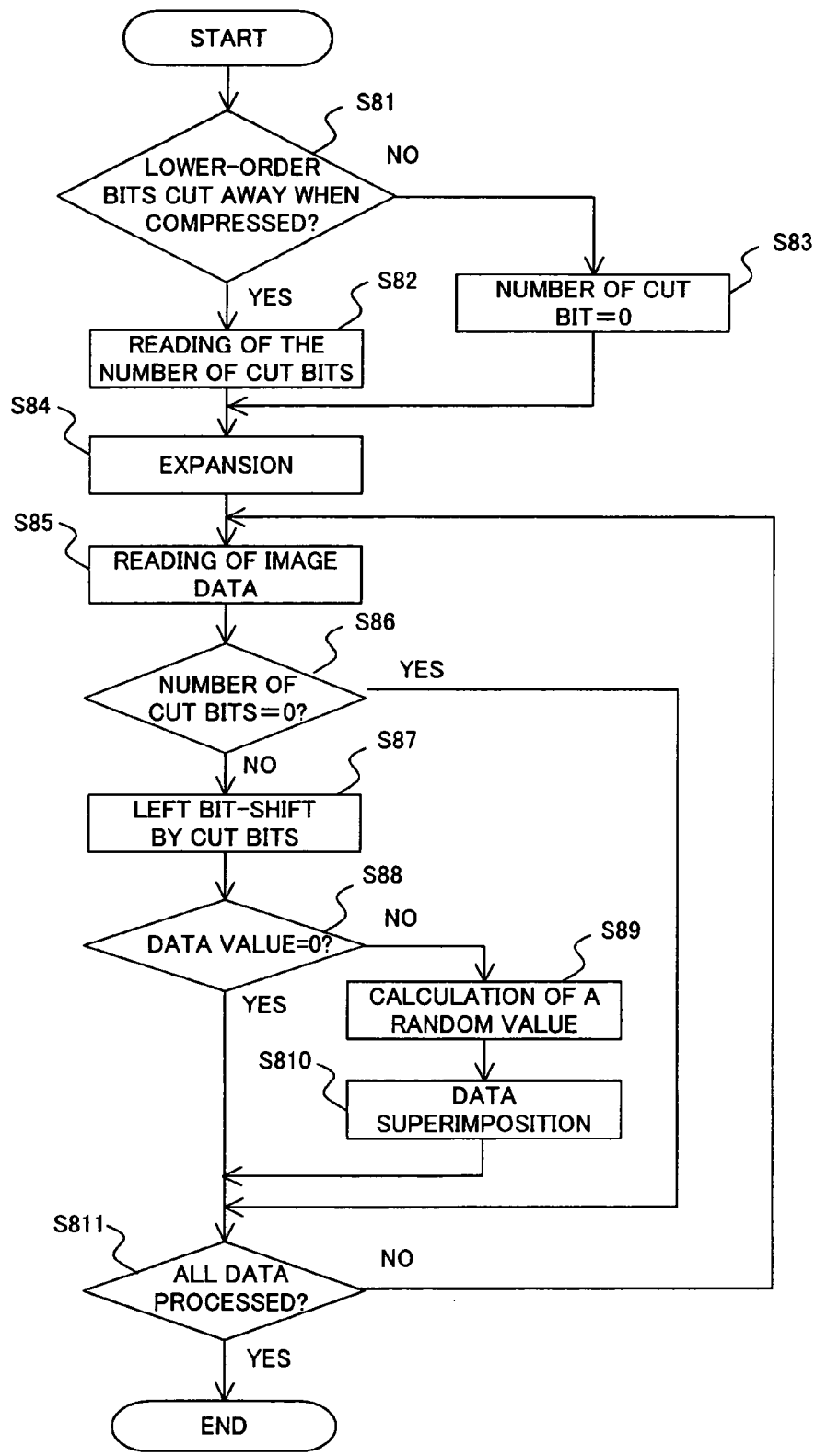
FIG. 8 is a flowchart showing the method using correlation with higher-order bits.

Next, the above-mention configuration is described with reference to the flowchart shown in FIG. 8.

In step S81, it is determined whether lower-order bits are cut away when compressing pixel data. If they are already cut away, the process proceeds to S82. If they are not cut away yet, the process proceeds to S83. In this case, information for determining whether lower-order bits are cut away is stored as part of compression information, such as the number of bits cut away when compressed, and the determination is made by referring to this information. A user can select how to handle the lower-order bits cut away when compressed. Alternatively, conditions can be determined based on the image state of all images, and it can be automatically selected based on the conditions.

In step S82, the number of bits to be cut away determined when compressed is read, and in step S83, since they are not cut away, the number of bits to be cut away is set to 0.

In step S84, all pixels contained in one image whose lower-order bits b are cut away and compressed are expanded to be converted into the cut pixel data before compression (10 bits).

In step S85 the data expanded in S84 is read, and in step S86 it is determined whether the cut bits are 0. If it is YES, the process proceeds to S811 without the superimposition process of lower-order bits. If it is NO, the process proceeds to step S87, and the entire bits are shifted to the left side by the cut bits. Then, in step S88 it is determined which the higher-order bits a of the data left-shifted in S87 is, 0, 1 or other than 0 and 1. if they are 0 or 1, it is YES and the process proceeds to S811. If it is NO, the process proceeds to S89, and 00, 01, 10 and 11 are selected as the value of ω(a), according to the conditions of S63. Then, equation (1) of S63 is calculated to calculate the lower-order bits b. Then, in step S810, the lower-order bits b are superimposed on the higher-order bits a by adding them.

In step S811, it is determined whether the process of all necessary pieces of pixel data is completed. If it is completed, the process proceeds to YES and terminates. If is not completed, the process proceeds to NO, the processes in S85 and after are repeated.

Although in this preferred embodiment 1, the lower-order bits b are calculated as ω(a)·a, the value of ω(a) can also be directly superimposed as lower-order bits.

Although in this preferred embodiment, the bit width of pixel data is 12 bits and is composed of 10 higher-order bits and 2 lower-order bits, the composition is not limited to this. It can be modified as long as the edge of an image and the discontinuity of gradation can be eliminated, further S/N can be improved and a favorable gradation characteristic can be obtained.

For example, weight can be randomly placed in the neighborhood of frequently appearing value in image data and 0 can be placed in the other part.

The edge of an image and the discontinuity of gradation can be eliminated and S/N can be improved by adding target image data using a random value and a fixed value as weighting coefficients, generating lower-order bits with the same bit width as those cut away and adding them.

Preferred Embodiment 2

In this preferred embodiment, 12-bit pixel data composed of higher-order bits $a_n$ (10 bits) and lower-order bits $c_n$ (2 bits) are processed by a method using the correlation with adjacent color components.

Figure 9:
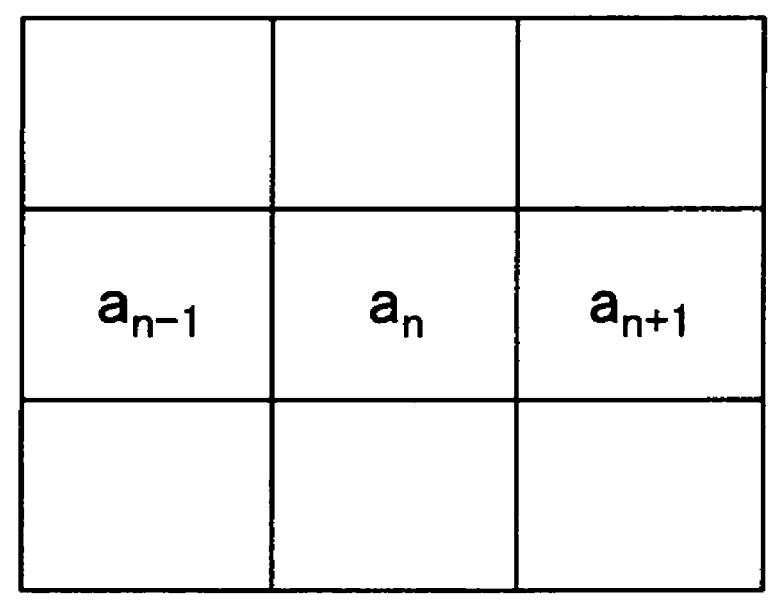

FIG. 9 shows adjacent pixels in Bayer array. In order to determine the lower-order bits $c_n$ of a pixel $a_n$ using the correlation with adjacent color components, the lower-order bits $c_n$ is calculated and determined based on the correlation in pixel data between the higher-order bits $a_{n-1}$ of a pixel adjacent to the pixel on the left side and the higher-order bits $a_{n+1}$ of a pixel adjacent to the pixel on the right side.

A method for calculating the lower-order bits $c_n$, based on the correlation with adjacent color components is described below with reference to FIG. 10.

In S101, the expanded 10-bit pixel data two bits of which are cut away when compressed is shifted to the left side by two bits. The entire bit is shifted to the MSB side by two bits by shifting the bits in S101. Then, in S102, two lower-order bits b0 and b1 are set to 0. In this case, each of b0 and b1 is set to 0.

In S103, $b_n$ is calculated according to equation (1) of S103. Firstly, $b_n=(a_{n-1}+a_{n+1})/2$ is calculated using the higher-order bits $a_{n-1}$ and $a_{n+1}$ (10-bit pixel data) of adjacent pixel data. Then, a value meeting the conditions is determined based on the result of $b_n$ by referring to equations (2) through (5) of S103. Equation (2) of S103 compares $b_n$ with a preset threshold value 1 ($k_1$). If $b_n > k_1$, $c_n$ is set to 3 ([b0][b1]→[1][1]).

Equation (3) of S103 compares $b_n$ with preset threshold values 1 ($k_1$) and 2 ($k_2$). If $k_2 < b_n < k_1$, $c_n$ is set to 2([b0][b1]→[1][0]).

Equation (4) of S103 compares $b_n$ with preset threshold values 2 ($k_2$) and 3 ($k_3$). If $k_3 < b_n < k_2$, $c_n$ is set to 2([b0][b1]→[0][1]).

Equation (5) of S103 compares $b_n$ with a preset threshold value 3 ($k_3$). If $b_n < k_3$, $c_n$ is set to 0([b0][b1]→[0][0]).

Then, in S104, the corrected lower-order bits $c_n$, being superimposition data determined in S103, is superimposed as the lower-order bits $c_n$ of the pixel data.

In this case, each of the preset threshold values $k_1$, $k_2$ and $k_3$ is set in the range between the maximum value (all higher-order bits are 1) and the minimum value (all higher-order bits are 0) of the averages of the higher-order bits of adjacent pixel data on each side. A user can also set this is such a way to obtain a desirable image.

Figure 10:
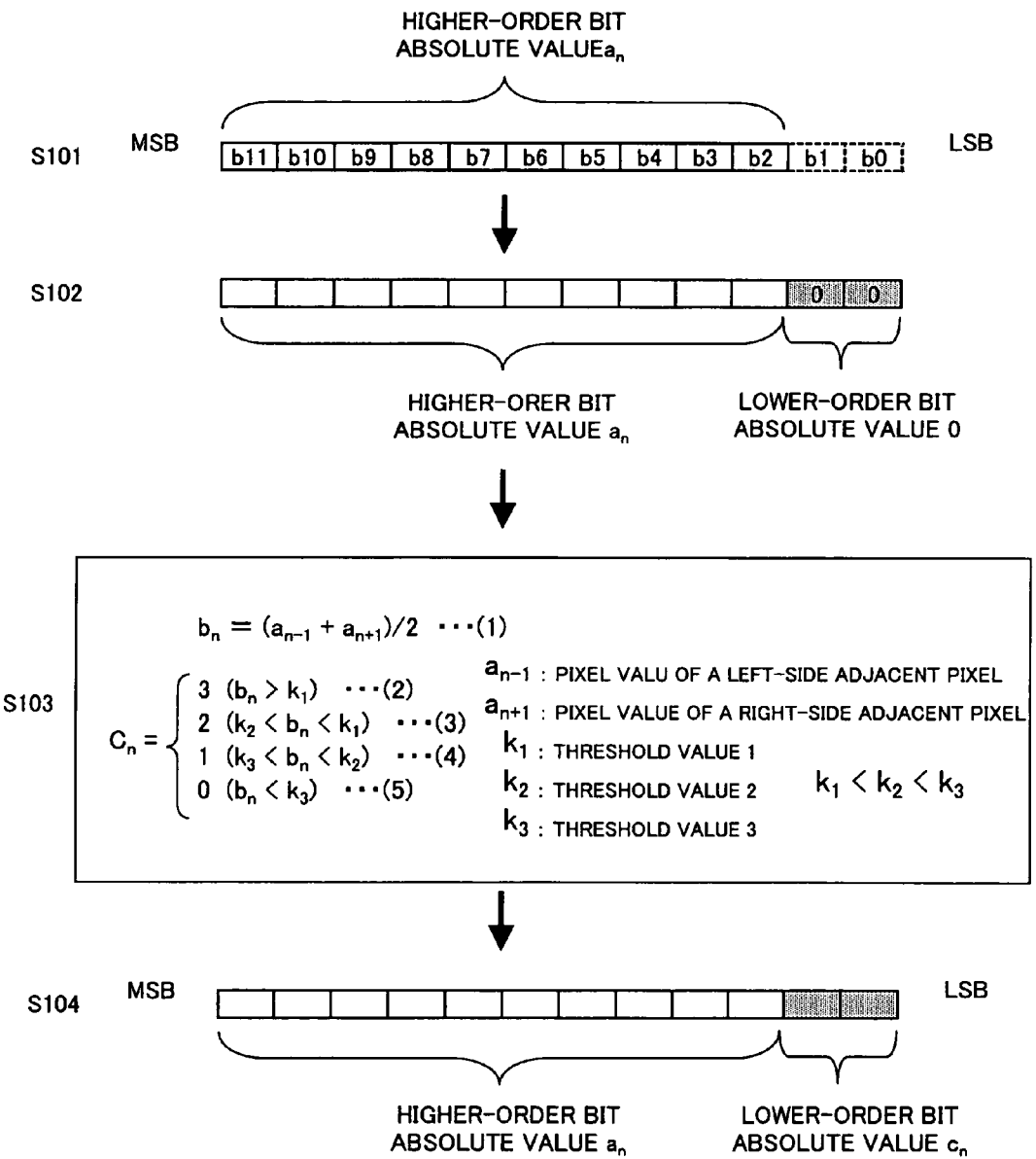
FIG. 10 shows a method using correlation with adjacent pixel data on each side.
Figure 11:
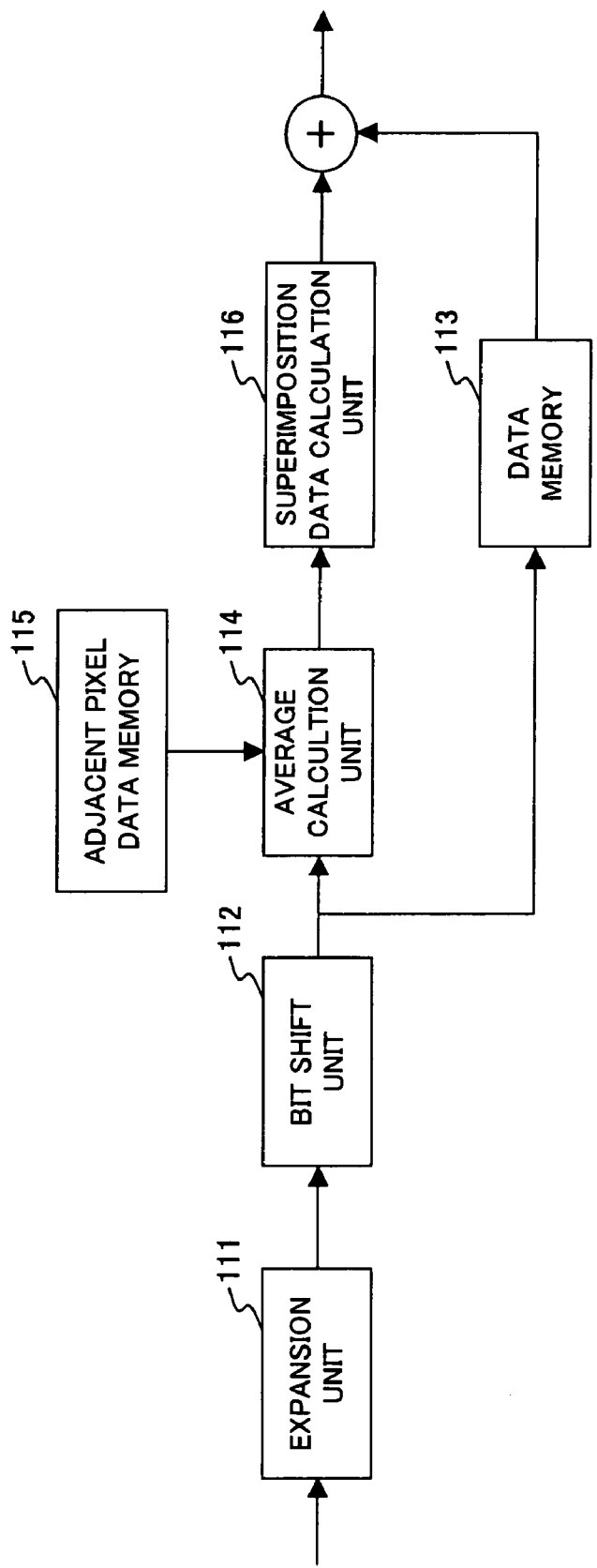
FIG. 11 shows the configuration of the method using correlation with adjacent pixel data on each side.

FIG. 11 shows the configuration for executing S101 through S104 shown in FIG. 10. An expansion unit 111 expands the 10-bit pixel data the two bits of which are cut away when compressed. Then, a bit shift unit 112 performs the processes in S101 and S102. Data memory 113 stores the result of S102. An average calculation unit 114 calls up $a_{n-1}$ and $a_{n+1}$ stored in an adjacent pixel data memory 115, and calculates $b_n$ according to equation (1) of S103. Then, a superimposition data calculation unit 116 determines $c_n$ according to the conditions of equations (2) through (5) of S103. After the calculation, 12-bit pixel data can be generated by adding the superimposition data and the 10-bit left-shifted pixel data $a_n$ stored in the data memory by the operation shown in S104.

Figure 12:
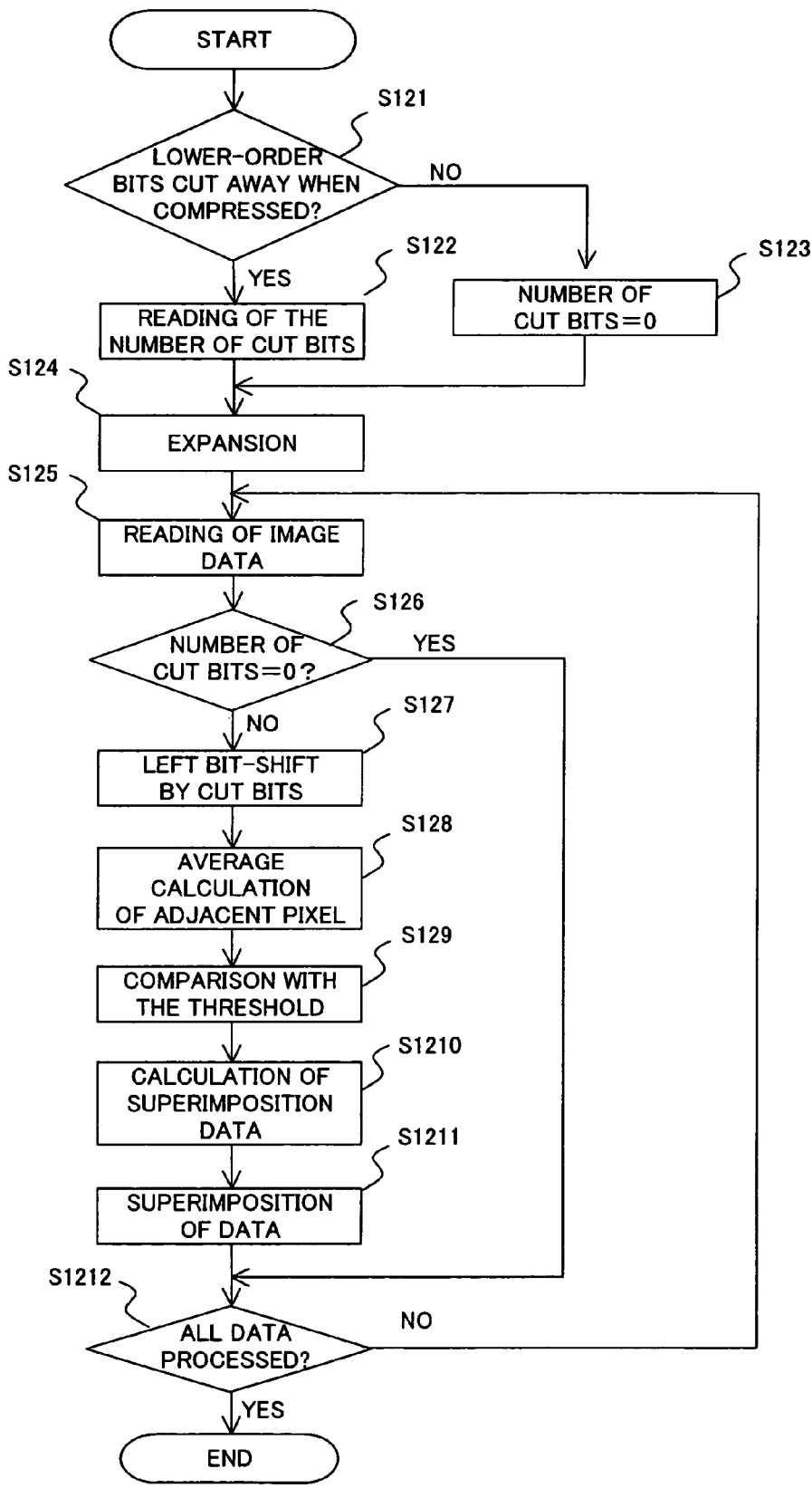
FIG. 12 is the flowchart of the method using correlation with adjacent pixel data on each side.

Next, the flowchart shown in FIG. 12 is described below.

In step S121, it is determined whether lower-order bits are cut away when compressing pixel data. In this case, information for determining whether lower-order bits are cut away is stored as part of compression information, such as the number of bits cut away when compressed, and the determination is made by referring to this information. If they are already cut away, the process proceeds to S112. If they are not cut away yet, the process proceeds to S123. In this case, a user can select how to handle the lower-order bits cut away when compressed. Alternatively, it can be automatically selected based on their image conditions.

In step S122, the number of bits to be cut away determined when compressed is read, and in step S1233, since they are not cut away, the number of bits to be cut away is set to 0.

In step S124, the compressed data is expanded and converted into the cut data.

In step S125, the cut data is read, and in step S126, it is determined whether the cut bits are 0. If it is YES, the process proceeds to S1212 without the superimposition process of lower-order bits. If it is NO, the process proceeds to step S127, and the entire bits are shifted to the left side by the cut bits.

Then, in step S128, equation (1) of S103 is calculated and the average $b_n$ of adjacent pixel data $a_{n-1}$ and $a_{n+1}$ is calculated according t $b_n=(a_{n-1}+a_{n+1})/2$.

Then, in step S1210, the value (0,1,2,3) of $c_n$ is selected according to the conditions of equations (2) through (5) of S103. Then, in step S1211, the lower-order bits $c_n$ is superimposed on the higher-order bits $a_n$ by adding them.

In step S1212, it is determined whether the process of all necessary pieces of pixel data is completed. If it is completed, the process proceeds to YES and terminates. If is not completed, the process proceeds to NO, the processes in S125 and after are repeated.

Although in this preferred embodiment, the bit width of pixel data is 12 bits and is composed of 10 higher-order bits and 2 lower-order bits, the composition is not limited to this.

The lower-order bits can be generated using the correlation with pixel data in the neighborhood of the target pixel data. Specifically, the lower-order bits can be generated using the correlation with adjacent pixel data on each side of the target pixel data. The lower-order bits can also be generated using the correlation including pixel data other than one on each end of the target pixel data (vertically adjacent pixel data of the target pixel data or adjacent pixel data adjacent to the target pixel data).

By adding such calculated lower-order bits, the edge of an image and the discontinuity of gradation can be eliminated, further S/N can be improved and a favorable gradation characteristic can be obtained.

The configuration can be modified as long as the edge of an image and the discontinuity of gradation can be eliminated, further S/N can be improved and a favorable gradation characteristic can be obtained.

Preferred Embodiment 3

In this preferred embodiment too, 12-bit pixel data composed of higher-order bits a (10 bits) and lower-order bits b (2 bits) are processed by a method using the correlation with adjacent color components.

FIG. 13 shows adjacent pixels in Bayer array. In order to determine the lower-order bits $c_n$ Of a pixel $a_n$ using the correlation with adjacent color components, the lower-order bits $c_n$ is calculated and determined based on the correlation in pixel data between a pixel $b_{n-1}$ adjacent to the pixel on the left side, a pixel $b_{n-1-1}$ above the pixel on the right side and a pixel $b_{n-1}$ above the pixel, whose lower-order bits are compensated.

A method for calculating the lower-order bits $c_n$, based on the correlation with adjacent color components is described below with reference to FIG. 14.

In S141, the expanded 10-bit pixel data two bits of which are cut away when compressed is shifted to the left side by two bits. The entire bit is shifted to the MSB side by two bits by shifting the bits in S141. Then, in S142, two lower-order bits b0 and b1 are set to 0. In this case, each of b0 and b1 is set to 0.

In S143, $b_n$ is calculated according to equation (1) of S143. Firstly, $b_n=(b_{n-1}+b_{n-1}-b_{n-1-1})$ is calculated using the adjacent pixel data $b_{n-1}$, $b_{n-1}$ and $b_{n-1-1}$. Then, a value meeting the conditions is determined based on the result of $b_n$ by referring to equations (2) through (5) of S143.

Equation (2) of S143 compares $b_n$ with a preset threshold value 4 ($k_4$). If $b_n>k_4$, $c_n$ is set to 3 ([b0][b1]→[1][1]).

Equation (3) of S143 compares $b_n$ with preset threshold values 4 ($k_4$) and 5($k_5$). If $k_5<b_n<k_4$, $c_n$ is set to 2 ([b0][b1]→[1][0]).

Equation (4) of S143 compares $b_n$ with preset threshold values 5 ($k_5$) and 6($k_6$). If $k_6<b_n<k_5$, $c_n$ is set to 2 ([b0][b1]→[0][1]).

Equation (5) of S143 compares $b_n$ with a preset threshold value 6 ($k_6$). If $b_n<k_6$, $c_n$ is set to 0 ([b0][b1]→[0][0]).

Then, in S144, the corrected lower-order bits $c_n$, being superimposition data determined in S143, is superimposed as the lower-order bits $c_n$ of the pixel data.

In this case, each of the preset threshold values $k_4$, $k_5$ and $k_6$ is set in the range between the maximum value and the minimum value of $b_n$. A user can also set this is such a way to obtain a desirable image.

Figure 14:
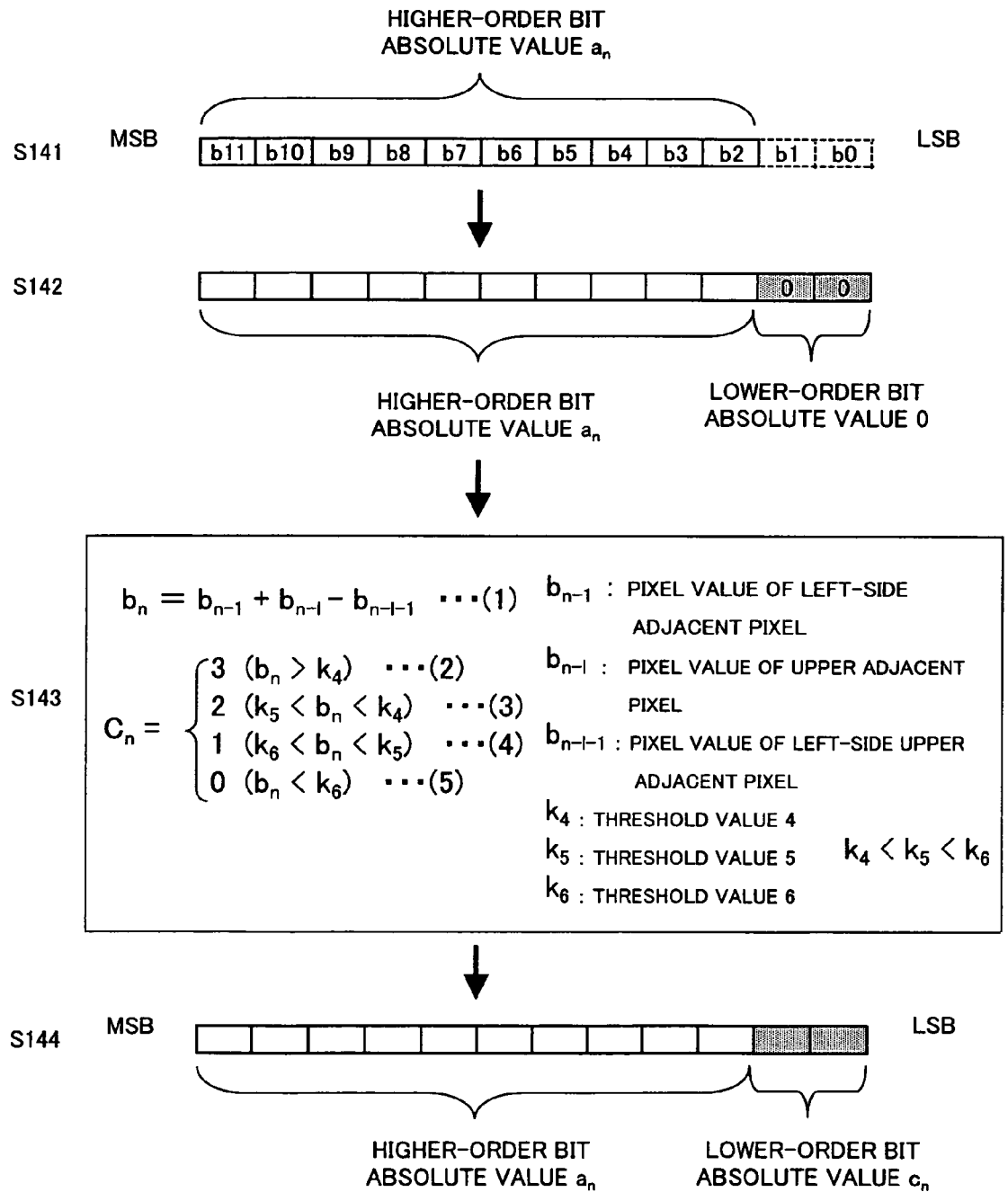
FIG. 14 shows a method using correlation with adjacent pixel data to the left, on the above and to the upper right.
Figure 15:
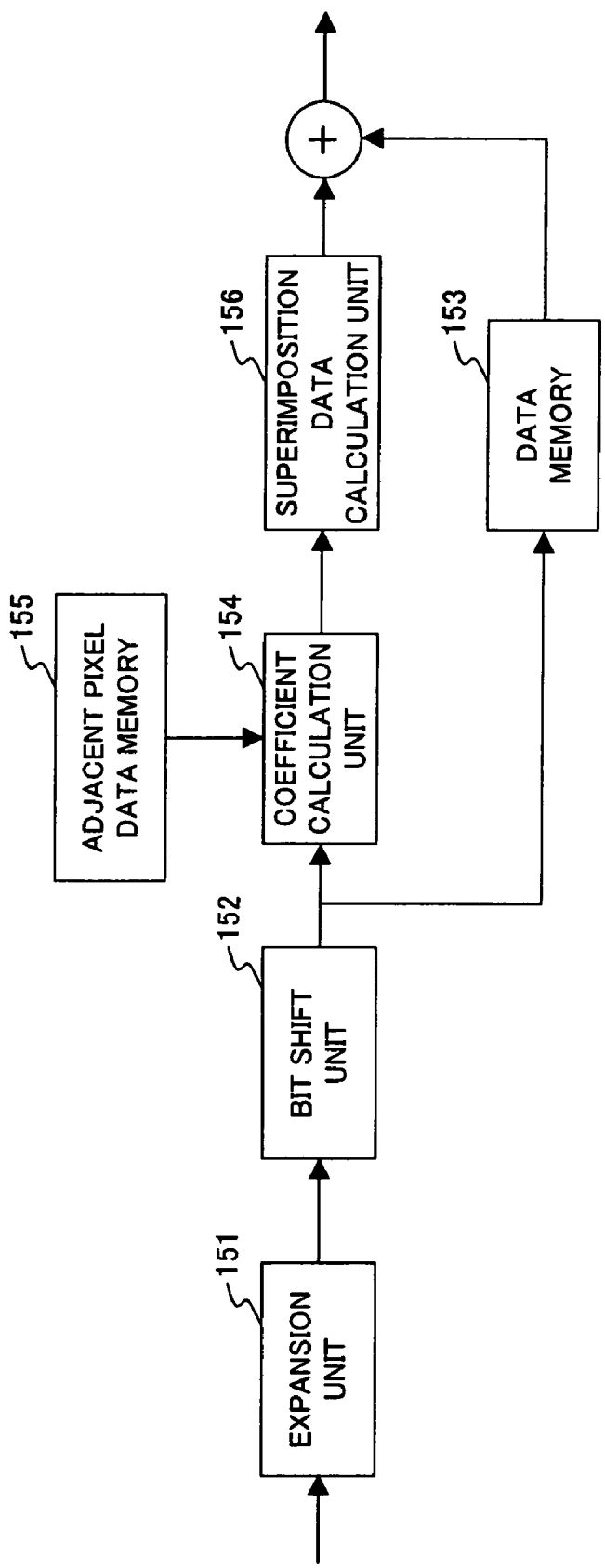
FIG. 15 shows the configuration of the method using correlation with adjacent pixel data to the left, on the above and to the upper right.

FIG. 15 shows the configuration for executing S141 through S154 shown in FIG. 14. An expansion unit 151 expands the 10-bit pixel data the two bits of which are cut away when compressed. Then, a bit shift unit 152 performs the processes in S141 and S142. Data memory 153 stores the result of S142. A coefficient ($b_n$) calculation unit 154 calls up $b_{n-1}$, $b_{n-1}$, and $b_{n-1-1}$ stored in an adjacent pixel data memory 155, and calculates $b_n$ according to equation (1) of S143. Then, a superimposition data calculation unit 156 determines $c_n$ according to the conditions of equations (2) through (5) of S143. After the calculation, 12-bit pixel data can be generated by adding the superimposition data and the 10-bit left-shifted pixel data $a_n$ stored in the data memory by the operation shown in S144.

Figure 16:
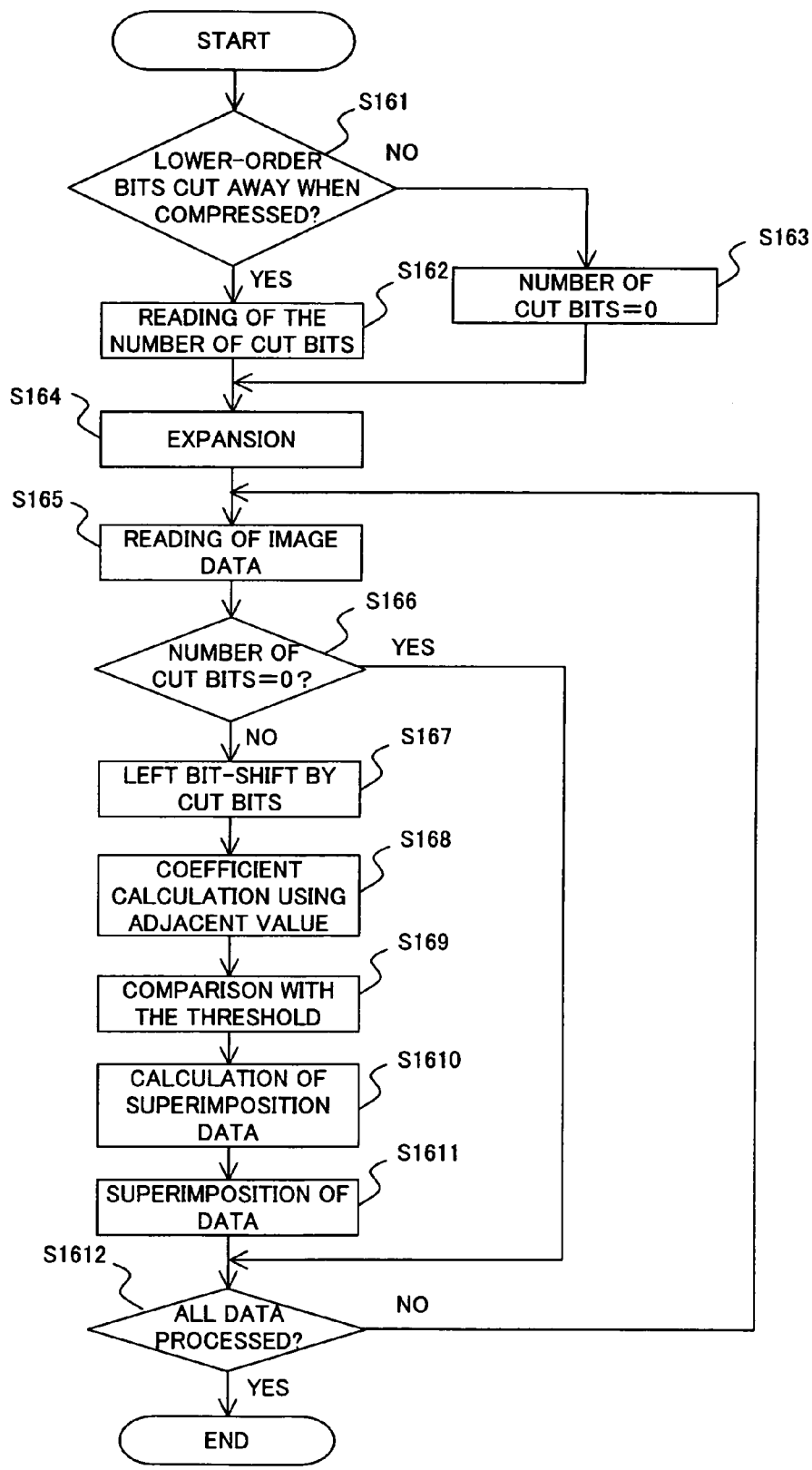
FIG. 16 is the flowchart of the method using correlation with adjacent pixel data to the left, on the above and to the upper right.

Next, the flowchart shown in FIG. 16 is described below.

In step S161, it is determined whether lower-order bits are cut away when compressing pixel data. In this case, information for determining whether lower-order bits are cut away is stored as part of compression information, such as the number of bits cut away when compressed, and the determination is made by referring to this information. If they are already cut away, the process proceeds to S162. If they are not cut away yet, the process proceeds to S163. In this case, a user can select how to handle the lower-order bits cut away when compressed. Alternatively, it can be automatically selected based on their image conditions.

In step S162, the number of bits to be cut away determined when compressed is read, and in step S163, since they are not cut away, the number of bits to be cut away is set to 0.

In step S164, the compressed data is expanded and converted into the cut data.

In step S165, the cut data is read, and in step S166, it is determined whether the cut bits are 0. If it is YES, the process proceeds to S1612 without the superimposition process of lower-order bits. If it is NO, the process proceeds to step S167, and the entire bits are shifted to the left side by the cut bits.

Then, in step S168, equation (1) of S143 is calculated, and a coefficient $b_n$ is calculated according t $b_n=(b_{n-1}+b_{n-1}-b_{n-1-1})$ using of adjacent pixel data $b_{n-1}$, $B_{n-1}$ and $B_{n-1-1}$.

Then, in step S169, the coefficient is compared with the threshold value according to the conditions of equations (2) through (5) of S143 and in step S1610, the value (0,1,2,3) of $C_n$ is selected. Then, in step S1611, the lower-order bits $c_n$ is superimposed on the higher-order bits $a_n$ by adding them.

In step S1612, it is determined whether the process of all necessary pieces of pixel data is completed. If it is completed, the process proceeds to YES and terminates. If is not completed, the process proceeds to NO, the processes in S165 and after are repeated.

Although in this preferred embodiment, the bit width of pixel data is 12 bits and is composed of 10 higher-order bits and 2 lower-order bits, the composition is not limited to this.

The lower-order bits can be generated using the correlation with pixel data in the neighborhood of the target pixel data. Specifically, the lower-order bits can be generated using the correlation with adjacent pixel data on each side of the target pixel data. The lower-order bits can also be generated using the correlation including pixel data other than one on each end of the target pixel data (vertically adjacent pixel data of the target pixel data or adjacent pixel data adjacent to the target pixel data).

By adding such calculated lower-order bits, the edge of an image and the discontinuity of gradation can be eliminated, further S/N can be improved and a favorable gradation characteristic can be obtained.

The configuration can be modified as long as the edge of an image and the discontinuity of gradation can be eliminated, further S/N can be improved and a favorable gradation characteristic can be obtained.

Preferred Embodiment 4

The image of an electronic camera device, such as a digital camera or the like, is easily influenced by the luminance component of a G (green) signal. In a digital camera, a primary color Bayer array in which G(green) is disposed checkerwise is popular, and the prediction accuracy of the G (green) signal in the R(red) and B(blue) positions leads to the improvement of resolution/image quality.

When dividing an image signal into adjacent pixel blocks, each block information can be indicated by a vector. It is known that the vector information of R, G and B signal components in each block is highly correlated particularly in a low-saturation area. Conventionally, a method for accurately predicting a G signal using a prediction value based on a G signal around R and B positions used for G correction and the vector information of an R or B signal is known.

In this preferred embodiment, 12-bit pixel data composed of higher-order bits $a_n$ (10 bits) and lower-order bits $c_n$ (2 bits) are processed by a method using the correlation with adjacent color components. In order to determine the lower-order bits $c_n$ of a pixel an using the correlation with adjacent color components, the color component correlation between two pieces of pixel data of adjacent pixels R(red) and B(blue) adjacent to G(green).

Figure 17:
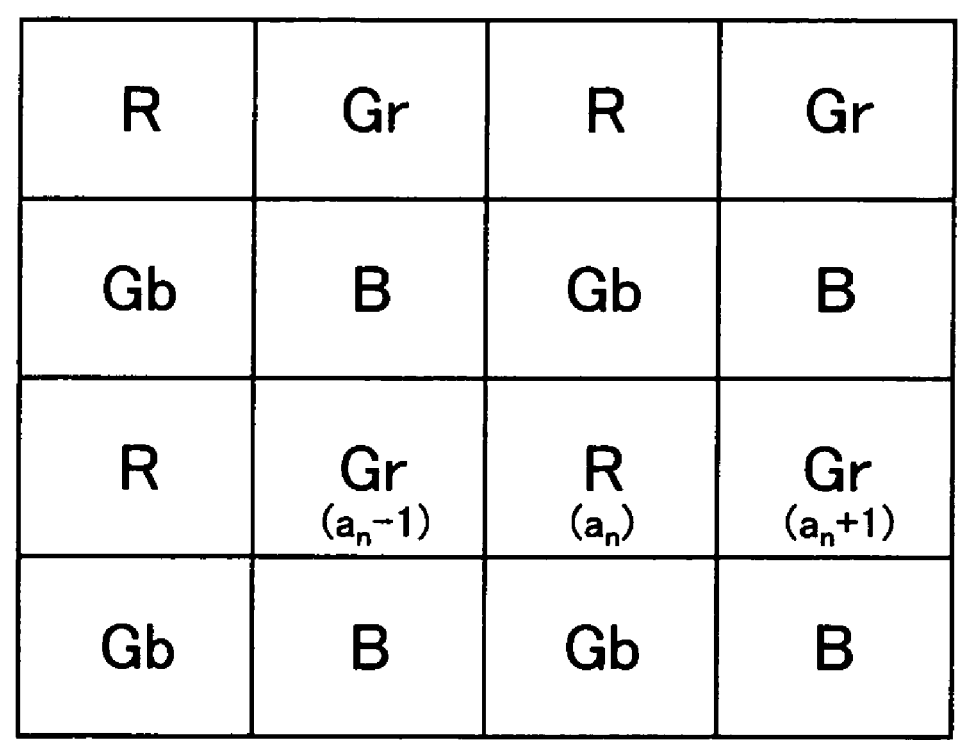

In this example, the following method is described in order to simplify the process. FIG. 17 shows the primary color Bayer array, in which G (green) located to the side of R(red) and G (green) located to the side of B(blue) is described as $G_r$ and $G_b$, respectively.

A method for calculating the lower-order bits, based on the correlation with adjacent color components is described below with reference to FIG. 18.

The lower-order bits of R(red) are determined based on the correlation with adjacent $G_r$, and the lower-order bits of $G_r$ are determined based on the correlation with adjacent R(red). The lower-order bits of B (blue) are determined based on the correlation with adjacent Gb, and the lower-order bits are determined based on the correlation of adjacent B (blue).

For example, in the following description, the lower-order bits of an R(red) pixel are calculated based on the correlation with adjacent $G_r$ pixel.

In S181, the expanded 10-bit pixel data of R(red), two bits of which are cut away when compressed, is shifted to the left side by two bits. Since the entire bit is shifted to the MSB side by two bits by shifting the bits in S181, in S182, each of two lower-order bits b0 and b1 are set to 0.

In sl83, $\omega_n$ and the lower-order bits $c_n$ are calculated according to equation 81) of S183. Firstly, $\omega_n()=A(G_r)$ is calculated using the respective higher-order bits (10-bit pixel data) of adjacent pixel data R(red) and $G_r$. In this case, A is a function to calculate a characteristic based on the entire image shot by a digital camera and calculate the correlation among R(red), G(green) and B(blue). As the function to calculate the correlation, a table can be prepared. Alternatively, a linear function, an n-degree function, an n-degree polynomial, regression analysis or the like can be calculated and used. A can also be a function based on the correlation with R(red) adjacent to $G_r$ or B(blue) adjacent to $G_b$, in the primary color Bayer array.

Then, $c_n$ is determined by assigning pixel data adjacent to the target pixel to the function $\omega_n()$. In this case too, $c_n$ is obtained by preparing a table or the like. For example, if two lower-order bits are determined, as in preferred embodiment 2, a threshold can be determined and one is selected from 0 through 3.

Then, the higher-order bits $a_{n-1}$ of the target adjacent pixel is calculated using $\omega_n$ and the lower-order bits $c_n$ is calculated. Then, in S184, the corrected lower-order bits $c_n$, being superimposition data determined in S183 is superimposed on the higher-order bits $a_n$.

Figure 18:
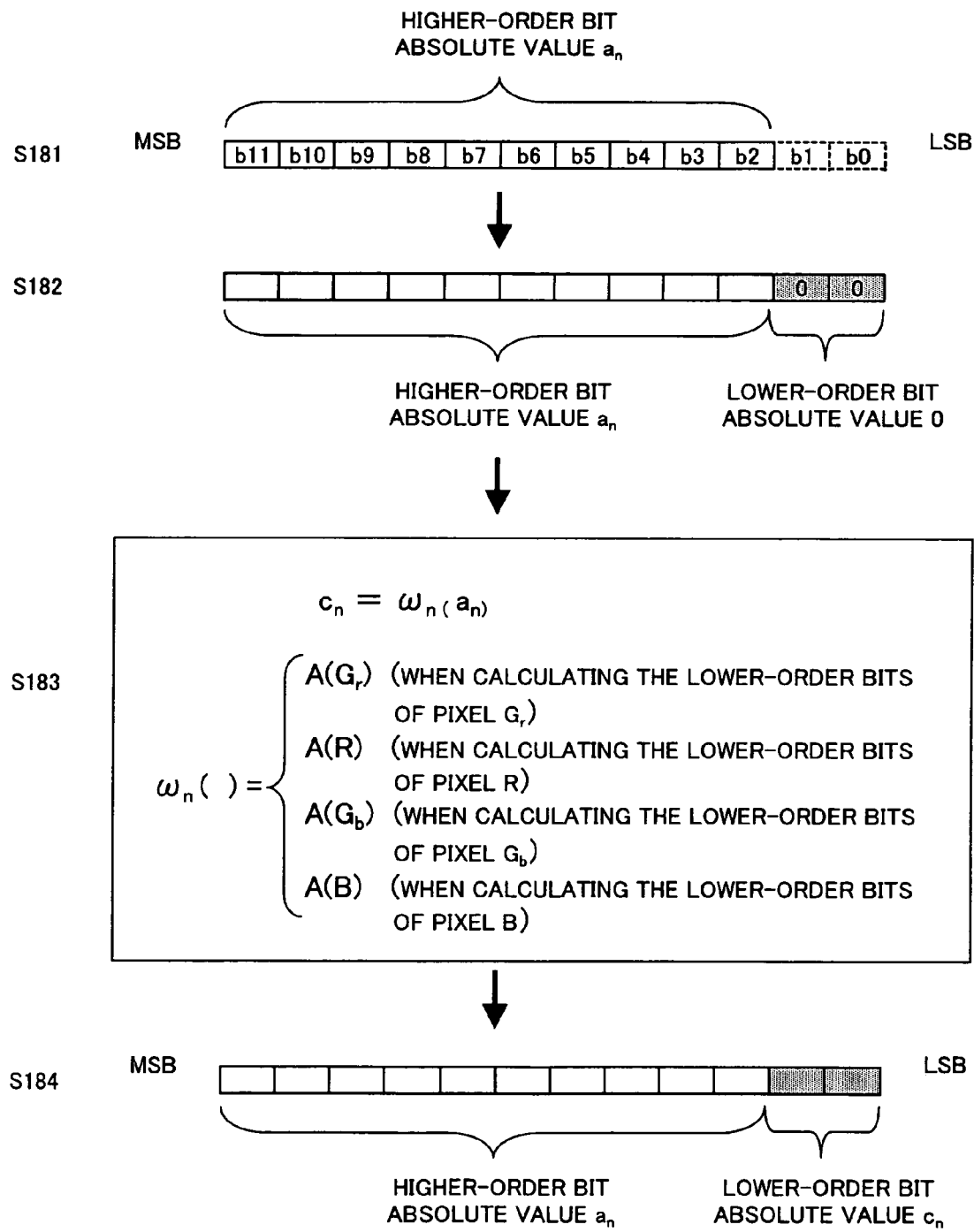
FIG. 18 shows a method using correlation with color components in the neighborhood.
Figure 19:
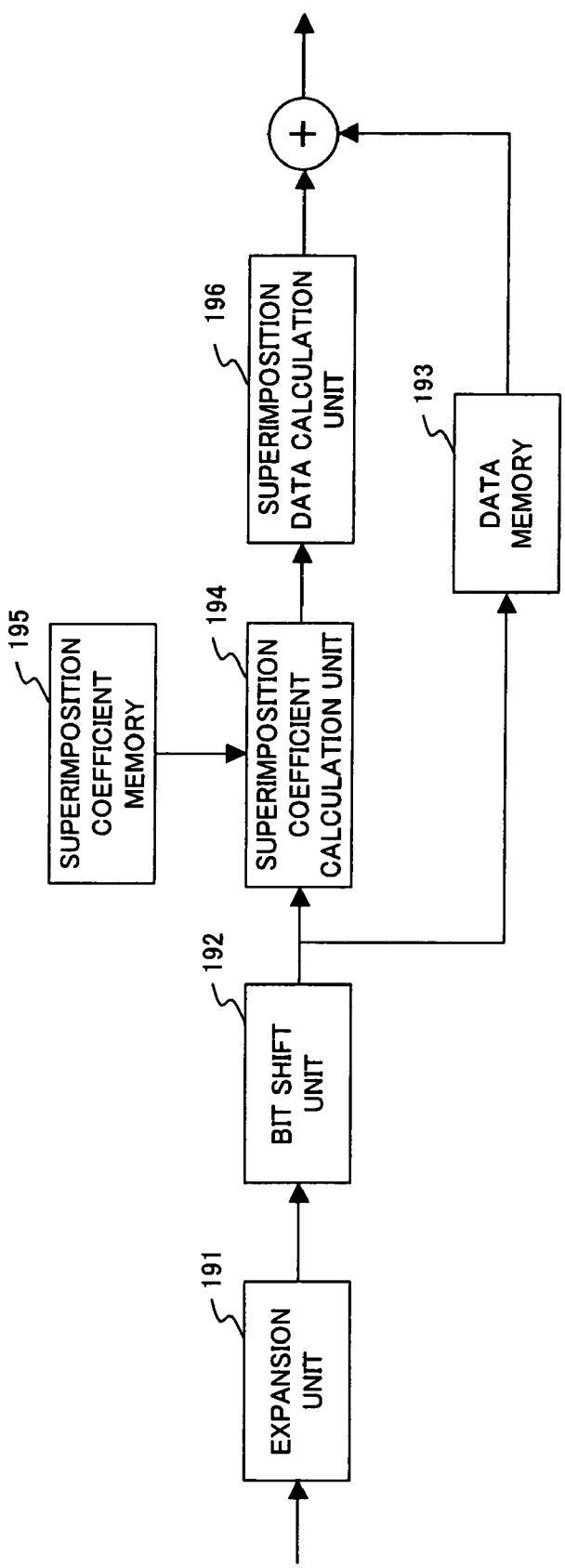
FIG. 19 shows the configuration of the method using correlation with color components in the neighborhood.

FIG. 19 shows the configuration for executing S181 through S184 shown in FIG. 18. An expansion unit 191 expands the 10-bit pixel data, two bits of which is cut away. Then, a bit shift unit 192 performs the processes in S181 and S182. Data memory 193 stores the result of S182. A superimposition coefficient reading unit 194 calls up $a_{n-1}$ and $a_{n+1}$ among all the pieces of pixel data stored in superimposition coefficient memory 195, and calculates $c_n$ according to S183. Then, a superimposition data calculation unit 196 determines $c_n$. After the calculation, the superimposition data is added to the 10-bit left-shifted pixel data $a_n$ stored in the data memory by the operation shown in S184 to generate 12-bit pixel data.

Next, the flowchart shown in FIG. 20 is described below.

In step S201, it is determined whether lower-order bits are cut away when compressing pixel data. In this case, information for determining whether lower-order bits are cut away is stored as part of compression information, such as the number of bits cut away when compressed, and the determination is made by referring to this information. If they are already cut away, the process proceeds to S202. If they are not cut away yet, the process proceeds to S203. In this case, a user can select how to handle the lower-order bits cut away when compressed. Alternatively, it can be automatically selected based on their image conditions.

In step S202, the number of bits to be cut away determined when compressed is read, and in step S203, since they are not cut away, the number of bits to be cut away is set to 0.

In step S204, the compressed data is expanded and converted into the cut data.

In step S205, the cut data is read, and in step S206, it is determined whether the cut bits are 0. If it is YES, the process proceeds to S2011 without the superimposition process of lower-order bits. If it is NO, the process proceeds to step S207, and the entire bits are shifted to the left side by the cut bits. Then, in step S208, the superimposition data is read, and in step S209, the lower-order bits $c_n$ is calculated by the operation in S203. Then, in step S2010, the lower-order bits $c_n$ is superimposed on the higher-order bits $a_n$ by adding them.

In step S2011, it is determined whether the process of all necessary pieces of pixel data is completed. If it is completed, the process proceeds to YES and terminates. If is not completed, the process proceeds to NO, the processes in S205 and after are repeated.

Although in this preferred embodiment, the bit width of pixel data is 12 bits and is composed of 10 higher-order bits and 2 lower-order bits, the composition is not limited to this. According to the above-mentioned configuration, the lower-order bits can be generated using the correlation with pixel data with a color component different from that of the target pixel data in the primary color Bayer array.

The lower-order bits can be generated by calculating color component correlation of the entire pixel data and using the color component correlation. The lower-order bits can also be generated by dividing pixel data, calculating the color component correlation of the divided intra-block image data and using the correlation. By retrieving data from a table using the value calculated based on the color component correlation, detecting the same number of lower-order bits as those cut away and adding the lower-order bits, the edge of an image and the discontinuity of gradation can be eliminated and S/N can be improved.

(Variation)

By superimposing data on data with a small number of gradations, the number of gradation can be increased. As this effect, an unnatural gradation change caused by an image processing can be eliminated.

For example, the tone jump at the edge and in the gradation part can be mitigated.

The present invention can also be implemented by generating a control program for enabling the CPU of the standard computer described earlier to execute the processes in the flowcharts shown in FIGS. 2, 3, 8, 12, 16 and 20, storing it in a computer-readable storage medium and enabling the computer to read the program from the storage medium and the CPU to execute it.

FIG. 21 shows examples of storage media on which is recorded such a control program which can be read by a computer system. As such a storage medium, a storage device 2102, such as ROM, a hard disk device, etc., built in or externally provided for a computer system 2101 as an auxiliary device, a portable storage medium 2104, such as a flexible disk, a magneto-optical disk (MO), CD-ROM, DVD-ROM, etc., the recorded control program of which can be read by inserting it a medium driving device 2103 provided for the computer system 2102 or the like can be used.

It can also be a storage device 2107 provided for the computer system, which is connected to the computer system 2101 via a communication line 2105 and functions as a program server 2106. In this case, a transmission signal obtained by modulating a data signal representing the control program by a carrier wave is transmitted to the computer system 2101 via the communication line 2105, being a transmission medium, from the program server 2106. The computer system 2101 can execute this control program by the CPU of the computer system 2101 by demodulating the received transmission signal and reproducing the control program.

Although in the above-mentioned preferred embodiments, a digital camera is used, the present invention is applicable to any other image processing device as long as the subject matter of the present invention set forth in What is claimed is not deviated.

The present invention provided an image processing device for eliminating the edge of an image and the discontinuity of gradation by expanding compressed image data whose lower-order bits are uniformly cut away as camera noise components when storing, calculating the data of lower-order bits for correcting the expanded pixel data after bit-shifting the expanded data and replacing the cut components (lower-order bits) with it, further improving S/N to obtain a favorable gradation characteristic.

As described above, the number of gradation can be increased by adding Superimposing) the corrected lower-order bits to (on) the image data whose lower-order bits are cut away. Thus, in an image to which image processing, such as compression/expansion or the like, the edge of an image and the discontinuity of gradation can be eliminated, S/N is improved and a favorable gradation characteristic can be obtained, thereby preventing an unnatural level change (tone jump) from occurring.

What is claimed is:

1. An image processing device for predicting lower-order bits of target pixel data, based on one or more pieces of pixel data constituting image data, comprising:
    a lower-order bit calculation unit for calculating the lower-order bits of the target pixel data, based on the one or more pieces of pixel data constituting the image data and specifying the calculated lower-order bits of the target pixel data as corrected lower-order bits;
    a lower-order bit superimposition unit for adding the corrected lower-order bits calculated by the lower-order bit calculation unit to higher-order bits of the target pixel data, and integrating image data that represents an image; and
    a memory for storing the superimposition result of the lower-order bit superimposition unit as a pixel data that represents a portion of the image,
    wherein the higher-order bits and lower-order bits constitute image data that represents the image.

2. The image processing device according to claim 1, wherein
    said lower-order bit calculation unit calculates the corrected lower-order bits, based on higher-order bits of the pixel data.

3. The image processing device according to. claim 1, wherein
    said lower-order bit calculation unit determines a weighting coefficient of a value of the pixel data and calculates the corrected lower-order bits by multiplying the higher-order bits of the target pixel data by the weighting coefficient.

4. The image processing device according to claim 1, wherein
said lower-order bit calculation unit calculates correlation with a pixel value of pixel data in the neighborhood of the target pixel data and calculates the corrected lower-order bits, based on the correlation.

5. The image processing device according to claim 4, wherein
said lower-order bit calculation unit calculates the correlation by calculating an average of higher-order bits of adjacent pixels on each side of the target pixel.

6. The image processing device according to claim 4, wherein
said lower-order bit calculation unit calculates the correlation by calculating an average of higher-order bits of pixels in the neighborhood of the target pixel.

7. The image processing device according to claim 1, wherein
said lower-order bit calculation unit calculates a first color component correlation, based on the higher-order bits of a pixel with a different color component in primary color Bayer array in the neighborhood of the target pixel, further calculates a second color component correlation, based on the result of the first color component correlation and the higher-order bits of the pixel and calculates the corrected lower-order bits, based on the second color component correlation.

8. The image processing device according to claim 7, wherein
said lower-order bit calculation unit calculates the first color component correlation by calculating a function, based on correlation using the higher-order bits of pixels of the entire image data.

9. The image processing device according to claim 7, wherein
said lower-order bit calculation unit calculates the first color component correlation by dividing the image data and calculating a function for each divided block, based on correlation with the higher-order bits of a pixel in the divided block.

10. The image processing device according to claim 7, wherein
said lower-order bit calculation unit calculates the second color component correlation by calculating the corrected lower-order bits using a table prepared beforehand using values calculated based on the first color component correlation.

11. An image processing method for predicting lower-order bits of target pixel data, based on one or more pieces of pixel data constituting image data, method comprising:
calculating the lower-order bits of the target pixel data, based on the one or more pieces of pixel data constituting the image data and specifying the calculated lower-order bits of the target pixel data as corrected lower-order bits;
adding the corrected lower-order bits calculated to higher-order bits of the target pixel data, and integrating image data that represents an image; and
storing the integrated result as a pixel data that represents a portion of the image,
wherein the higher-order bits and lower-order bits constitute the image data that represents the image.

12. The image processing method according to claim 11, wherein
the program enables the computer to calculate the lower-order bits of the target pixel data, based on the corrected higher-order bits of the pixel data.

* * * * *